United States Patent
Weiss

(10) Patent No.: US 11,716,522 B2
(45) Date of Patent: Aug. 1, 2023

(54) FOLLOWER VEHICLE SENSOR SYSTEM

(71) Applicant: PIAGGIO FAST FORWARD, INC., Boston, MA (US)

(72) Inventor: Mitchell Weiss, Carlisle, MA (US)

(73) Assignee: Piaggio Fast Forward Inc., Boston, MA (US)

( * ) Notice: Subject to any disclaimer, the term of this patent is extended or adjusted under 35 U.S.C. 154(b) by 0 days.

(21) Appl. No.: 17/444,608

(22) Filed: Aug. 6, 2021

(65) Prior Publication Data

US 2022/0046155 A1 Feb. 10, 2022

Related U.S. Application Data

(60) Provisional application No. 63/061,897, filed on Aug. 6, 2020.

(51) Int. Cl.
| | |
|---|---|
| *H04N 5/225* | (2006.01) |
| *G06T 7/20* | (2017.01) |
| *H04N 5/247* | (2006.01) |
| *H04N 23/45* | (2023.01) |
| *H04N 23/51* | (2023.01) |
| *H04N 23/90* | (2023.01) |

(52) U.S. Cl.
CPC ............ *H04N 23/45* (2023.01); *G06T 7/20* (2013.01); *H04N 23/51* (2023.01); *H04N 23/90* (2023.01); *G06T 2207/30196* (2013.01)

(58) Field of Classification Search
None
See application file for complete search history.

(56) References Cited

U.S. PATENT DOCUMENTS

| | | |
|---|---|---|
| 9,917,355 B1 | 3/2018 | Lee et al. |
| 10,173,738 B2 | 1/2019 | Schnapp et al. |
| 10,293,676 B2 | 5/2019 | Schnapp et al. |
| 10,405,196 B1 * | 9/2019 | Chadaga .............. H04B 17/318 |
| D890,024 S | 7/2020 | Schnapp et al. |
| D911,405 S | 2/2021 | Ekmekjian et al. |
| D913,351 S | 3/2021 | Ekmekjian et al. |
| 11,112,807 B1 | 9/2021 | Weiss et al. |
| 2015/0372387 A1 | 12/2015 | Porter et al. |

(Continued)

OTHER PUBLICATIONS

International Search Report and Written Opinion dated Dec. 23, 2021 issued in corresponding International Application No. PCT/US21/44942.

*Primary Examiner* — Edemio Navas, Jr.
(74) *Attorney, Agent, or Firm* — Sunstein LLP

(57) ABSTRACT

Provided is a sensing system useful with a follower vehicle configured to track and follow a leader. The sensing system can include a plurality of sensing technologies configured to cooperatively track and follow the leader. In some embodiments, the plurality of sensing technologies can include one or more of a stereoscopic camera ranging system, a wide field of view monocular camera, and a radar imaging system, or other sensor technologies. In various embodiments, the vehicle can comprise a chassis, a drive mechanism supported by the chassis and arranged to drive a plurality of wheels, a body supported by the chassis and, optionally, an internal volume defined within the body. In some embodiments, the follower vehicle can be a two-wheeled mobile carrier, for example.

12 Claims, 23 Drawing Sheets

(56) References Cited

U.S. PATENT DOCUMENTS

| | | | |
|---|---|---|---|
| 2016/0188977 A1* | 6/2016 | Kearns | G06V 40/172 |
| | | | 348/113 |
| 2016/0231417 A1* | 8/2016 | Aoki | G01S 7/032 |
| 2018/0032042 A1 | 2/2018 | Turpin et al. | |
| 2018/0105033 A1 | 4/2018 | Schnapp et al. | |
| 2018/0105215 A1 | 4/2018 | Schnapp et al. | |
| 2019/0137629 A1 | 5/2019 | Kotelova et al. | |
| 2019/0379467 A1* | 12/2019 | Neumeier | H04B 17/30 |
| 2020/0047826 A1 | 2/2020 | Schnapp et al. | |
| 2020/0122797 A1 | 4/2020 | Weiss | |
| 2020/0124159 A1 | 4/2020 | Weiss | |
| 2020/0239098 A1 | 7/2020 | Schnapp et al. | |
| 2021/0255646 A1 | 8/2021 | Weiss et al. | |

\* cited by examiner

FOLLOWER VEHICLE SENSOR SYSTEM

CROSS REFERENCE TO RELATED APPLICATIONS

The present application claims priority to U.S. Provisional Pat. Appl. No. 63/061,897 entitled Leader Tracking System for Vehicles, filed Aug. 6, 2020, which is incorporated herein by reference in its entirety.

The present application, while not claiming priority to, may be related to U.S. patent application Ser. No. 17/444,296, filed on Aug. 3, 2021, which is a continuation of U.S. patent application Ser. No. 17/049,141, filed on Oct. 20, 2020, now U.S. Pat. No. 11,112,807, issued on Sep. 7, 2021, which are incorporated herein by reference in their entirety.

The present application, while not claiming priority to, may be related to U.S. Pat. No. 10,293,676, issued on May 21, 2019, which is incorporated herein by reference in its entirety.

The present application, while not claiming priority to, may be related to U.S. Pat. No. 10,173,738, issued on Jan. 8, 2019, which is incorporated herein by reference in its entirety.

The present application, while not claiming priority to, may be related to U.S. patent application Ser. No. 16/342,732, filed on Apr. 17, 2019, published as U.S. Pat. Pub. No. US 2020/0047826 on Feb. 13, 2020, which is incorporated herein by reference in its entirety.

The present application, while not claiming priority to, may be related to U.S. Pat. No. 10,351,190, issued on Jul. 16, 2019, which is incorporated herein by reference in its entirety.

The present application, while not claiming priority to, may be related to U.S. patent application Ser. No. 16/652,545, filed on Mar. 31, 2020, published as U.S. Pat. Pub. No. US 2020/0239098 on Jul. 30, 2020, which is incorporated herein by reference in its entirety.

The present application, while not claiming priority to, may be related to U.S. patent application Ser. No. 16/183,198, filed on Nov. 7, 2018, published as U.S. Pat. Pub. No. US 2019/0137629 on May 9, 2019, which is incorporated herein by reference in its entirety.

The present application, while not claiming priority to, may be related to U.S. patent application Ser. No. 16/660,560, filed on Oct. 22, 2019, published as U.S. Pub. No. US 2020/0124159 on Apr. 23, 2020, which is incorporated herein by reference in its entirety.

The present application, while not claiming priority to, may be related to U.S. patent application Ser. No. 16/660,570, filed on Oct. 22, 2019, published U.S. Pub. No. US 2020/0122797 on Apr. 23, 2020, which is incorporated herein by reference in its entirety.

FIELD OF INTEREST

The present description generally relates to sensor systems and methods for auto-navigating vehicles, and more particularly, but not exclusively, to imaging systems used for follower vehicles.

BACKGROUND

A follower vehicle is a vehicle that automatically follows along the same or similar path to a leader. The ability of a follower vehicle to acquire and track a leader can be affected by bright sunlight, darkness, rain, fog, etc. Also, the more potential targets in a scene, the harder it is for a follower vehicle to differentiate the targets to select the "right" one, i.e., the leader. In view of these challenges, a follower vehicle with a monolithic sensor system may have trouble acquiring, tracking, and/or following a leader.

It would be advantageous to provide a sensor system that enables improved acquisition, tracking, and/or following of a leader. It would also be advantageous to provide an on-vehicle sensor system that enables improved acquisition, tracking, and/or following of a leader. Further, it would be advantageous to provide a sensor system including a plurality of sensor types that cooperate to improve acquisition, tracking, and/or following of a leader

SUMMARY

In accordance with one aspect of the inventive concepts, provided is a follower vehicle employing a combination of two or more sensor technologies to acquire and track a leader, such as a human.

In various embodiments, the follower vehicle can be a mobile carrier vehicle.

In various embodiments, the follower vehicle can have two or more wheels.

In various embodiments, the sensor technologies include three-dimensional (3D) radio imaging and wide field of view (FOV) monocular imaging.

In various embodiments, the sensor technologies include 3D optical imaging and wide FOV monocular imaging.

In various embodiments, the sensor technologies include 3D optical imaging and 3D radio imaging.

In various embodiments, the sensor technologies include 3D optical imaging, 3D radio imaging, and wide FOV monocular imaging.

In accordance with another aspect of the inventive concepts, provided is a sensor apparatus, comprising a plurality of different sensing systems comprising different types of imaging sensors configured to cooperatively track a leader and a sensor module including a cover configured to encase the different types of imaging sensors and to couple to a vehicle.

In various embodiments, the plurality of different sensing systems provides a plurality of fields of views including at least two overlapping fields of view.

In various embodiments, the plurality of fields of view includes at least three overlapping fields of view.

In various embodiments, the plurality of different sensing systems includes at least two different types of imaging systems.

In various embodiments, the plurality of different sensing systems includes a 3D radio imaging system comprising at least one 3D radio imaging sensor comprising at least one antenna.

In various embodiments, the cover includes a radome area formed of material transparent to radio waves of the at least one antenna.

In various embodiments, the 3D radio imaging system comprises a radar PCB comprising at least one antenna and a heatsink plate adjacent to the radar PCB, wherein the radar PCB is disposed in parallel between the radome area of the cover and the heatsink plate.

In various embodiments, the plurality of different sensing systems includes at least one three-dimensional (3D) radio imaging sensor and at least one wide angle field of view (FOV) monocular camera.

In various embodiments, the sensor module comprises a mounting plate to which the cover couples; the 3D radio imaging system comprises a radar PCB comprising at least one antenna and a heatsink plate adjacent to the radar PCB; and the wide angle FOV monocular camera. The radar PCB, the heatsink plate, and the wide angle FOV monocular camera couple to the mounting plate so that the radar PCB and the heatsink plate are disposed in parallel in a bottom area of the mounting plate near a radome area of the cover and the wide angle FOV monocular camera is disposed in a top area of the mounting plate above the radar PCB and the heatsink plate.

In various embodiments, the plurality of different sensing systems includes a 3D optical imaging system and a wide FOV monocular system.

In various embodiments, the sensor module comprises: a mounting plate to which the cover couples; the 3D optical imaging system comprises a sensor system PCB, a stereo camera coupled to the sensor system PCB, and a stereoscopic camera heatsink coupled to the stereo camera; and the wide angle FOV monocular camera. The sensor system PCB and the wide angle FOV monocular camera couple to the mounting plate.

In various embodiments, the plurality of different sensing systems includes a 3D optical imaging system and a 3D radio imaging system.

In various embodiments, the sensor module comprises: a mounting plate to which the cover couples; the 3D radio imaging system comprises a radar PCB comprising at least one antenna, and a heatsink plate adjacent to the radar PCB; and the 3D optical imaging system comprises a sensor system PCB, a stereo camera coupled to the sensor system PCB, and a stereoscopic camera heatsink coupled to the stereo camera. The radar PCB, the heatsink plate, and the sensor system PCB couple to the mounting plate so that the radar PCB and the heatsink plate are disposed in parallel in a bottom area of the mounting plate near a radome area of the cover and the stereo camera is disposed in a top area of the mounting plate above the radar PCB and the heatsink plate.

In various embodiments, the plurality of different sensing systems includes a 3D optical imaging system, a 3D radio imaging system, and a wide FOV monocular system.

In various embodiments, the sensor module comprises a mounting plate to which the cover couples; the 3D radio imaging system comprises a radar PCB comprising at least one antenna and a heatsink plate adjacent to the radar PCB; and the 3D optical imaging system comprises a sensor system PCB, a stereo camera coupled to the sensor system PCB, and a stereoscopic camera heatsink coupled to the stereo camera; and the wide angle FOV monocular camera. The radar PCB, the heatsink plate, the sensor system PCB, and the wide angle FOV monocular camera couple to the mounting plate so that the radar PCB and the heatsink plate are disposed in parallel in a bottom area of the mounting plate near a radome area of the cover and the wide angle FOV monocular camera and the stereo camera are disposed in a top area of the mounting plate above the radar PCB and the heatsink plate.

In various embodiments, a field of view of the 3D radio imaging sensor is between 90 degrees and 180 degrees.

In various embodiments, a field of view of the at least one 3D radio imaging sensor is about 160 degrees.

In various embodiments, a field of view of the at least one wide angle field of view (FOV) monocular camera is 45 degrees to 135 degrees.

In various embodiments, a field of view of the at least one wide angle field of view (FOV) monocular camera is about 90 degrees.

In various embodiments, a field of view of the 3D radio imaging sensor is between 90 degrees and 180 degrees.

In various embodiments, a field of view of the at least one 3D radio imaging sensor is about 130 degrees.

In various embodiments, the apparatus further comprises a user interface comprising at least one user interface mechanism within the cover and operable by the leader to initiate a pairing operation to activate at least one sensing system from the plurality of different sensing systems to record at least one characteristics of the leader.

In various embodiments, the user interface comprises a biometric sensor configured to collect biometric information associated with the leader, and the at least one characteristics of the leader is determined using the biometric information.

In various embodiments, the vehicle is a follower vehicle.

In accordance with another aspect of the inventive concepts, provided is a follower vehicle, comprising a chassis; a drive mechanism supported by the chassis and arranged to drive a plurality of wheels; a body supported by the chassis; and a sensor apparatus. The sensor apparatus comprises a plurality of different sensing systems comprising different types of imaging sensors configured to cooperatively track a leader and a sensor module including a cover configured to encase the different types of imaging sensors and to couple to a vehicle.

In various embodiments, the plurality of different sensing systems provides a plurality of fields of views including at least two overlapping fields of view.

In various embodiments, the plurality of fields of view includes at least three overlapping fields of view.

In various embodiments, the plurality of different sensing systems includes at least two different types of imaging systems.

In various embodiments, the plurality of different sensing systems includes a 3D radio imaging system comprising at least one 3D radio imaging sensor comprising at least one antenna.

In various embodiments, the cover includes a radome area formed of material transparent to radio waves of the at least one antenna.

In various embodiments, the 3D radio imaging system comprises a radar PCB comprising at least one antenna and a heatsink plate adjacent to the radar PCB, and the radar PCB is disposed in parallel between the radome area of the cover and the heatsink plate.

In various embodiments, the plurality of different sensing systems includes a three-dimensional (3D) radio imaging system and a wide angle field of view (FOV) monocular camera.

In various embodiments, the sensor module comprises a mounting plate to which the cover couples; the 3D radio imaging system comprises a radar PCB comprising at least one antenna and a heatsink plate adjacent to the radar PCB; and the wide angle FOV monocular camera. The radar PCB, the heatsink plate, and the wide angle FOV monocular camera couple to the mounting plate so that the radar PCB and the heatsink plate are disposed in parallel in a bottom area of the mounting plate near a radome area of the cover and the wide angle FOV monocular camera is disposed in a top area of the mounting plate above the radar PCB and the heatsink plate.

In various embodiments, the plurality of different sensing systems includes a 3D optical imaging system and a wide FOV monocular camera.

In various embodiments, the sensor module comprises a mounting plate to which the cover couples; the 3D optical imaging system comprises a sensor system PCB, a stereo camera coupled to the sensor system PCB, and a stereoscopic camera heatsink coupled to the stereo camera; and the wide angle FOV monocular camera. The sensor system PCB and the wide angle FOV monocular camera couple to the mounting plate.

In various embodiments, the plurality of different sensing systems includes a 3D optical imaging system and a 3D radio imaging system.

In various embodiments, the sensor module comprises a mounting plate to which the cover couples; the 3D radio imaging system comprises a radar PCB comprising at least one antenna and a heatsink plate adjacent to the radar PCB; and the 3D optical imaging system comprises a sensor system PCB, a stereo camera coupled to the sensor system PCB; and a stereoscopic camera heatsink coupled to the stereo camera. The radar PCB, the heatsink plate, and the sensor system PCB couple to the mounting plate so that the radar PCB and the heatsink plate are disposed in parallel in a bottom area of the mounting plate near a radome area of the cover and the stereo camera is disposed in a top area of the mounting plate above the radar PCB and the heatsink plate.

In various embodiments, the plurality of different sensing systems includes a 3D optical imaging system, a 3D radio imaging system, and a wide FOV monocular camera.

In various embodiments, the sensor module comprises a mounting plate to which the cover couples; the 3D radio imaging system comprises a radar PCB comprising at least one antenna and a heatsink plate adjacent to the radar PCB; the 3D optical imaging system comprises a sensor system PCB, a stereo camera coupled to the sensor system PCB, and a stereoscopic camera heatsink coupled to the stereo camera; and the wide angle FOV monocular camera. The radar PCB, the heatsink plate, the sensor system PCB, and the wide angle FOV monocular camera couple to the mounting plate so that the radar PCB and the heatsink plate are disposed in parallel in a bottom area of the mounting plate near a radome area of the cover and the wide angle FOV monocular camera and the stereo camera are disposed in a top area of the mounting plate above the radar PCB and the heatsink plate.

In various embodiments, a field of view of the 3D radio imaging sensor is between 90 degrees and 180 degrees.

In various embodiments, a field of view of the at least one 3D radio imaging sensor is about 160 degrees.

In various embodiments, a field of view of the at least one wide angle field of view (FOV) monocular camera is 45 degrees to 135 degrees.

In various embodiments, a field of view of the at least one wide angle field of view (FOV) monocular camera is about 90 degrees.

In various embodiments, a field of view of the 3D radio imaging sensor is between 90 degrees and 180 degrees.

In various embodiments, a field of view of the at least one 3D radio imaging sensor is about 130 degrees.

In various embodiments, the vehicle further comprises a user interface comprising at least one user interface mechanism within the cover and operable by the leader to initiate a pairing operation to activate at least one sensing system from the plurality of different sensing systems to record at least one characteristics of the leader.

In various embodiments, the user interface comprises a biometric sensor configured to collect biometric information associated with the leader, and the at least one characteristics of the leader is determined using the biometric information.

In various embodiments, the user interface mechanism includes as least one output devices indicating that the leader and the vehicle are paired and the last one output device optionally includes at least one light.

In various embodiments, the plurality of wheels is two wheels.

In various embodiments, the follower vehicle can be a mobile carrier vehicle.

In accordance with another aspect of the inventive concepts, provided is a sensor system, comprising a first sensor system comprising one or more first sensors providing first sensor data used to establish a first field of view, a second sensor system comprising one or more second sensors providing second sensor data used to establish a second field of view overlapping the first field of view, and at least one processor configured to process the first sensor data and the second sensor data to track and follow a leader within the first and second fields of view.

In various embodiments, the leader is an acquired leader having one or more characteristics stored in at least one computer storage device, In various embodiments, the at least one processor is configured to process at least some of the first sensor data and/or the second sensor data to identify and store in the at least one computer storage device the one or more characteristics of the leader in a pairing operation to acquire the leader.

In various embodiments, the system further comprises a user interface comprising at least one user interface mechanism operable by the leader to initiate the pairing operation.

In various embodiments, the user interface comprises a biometric sensor configured to collect biometric information associated with the leader and used by the at least one processor in the pairing operation.

In various embodiments, at least one of the first sensor system and the second sensor system comprises a three-dimensional radar imaging system.

In various embodiments, at least one of the first sensor system and the second sensor system comprises a three-dimensional stereoscopic imaging system.

In various embodiments, at least one of the first sensor system and the second sensor system comprises a wide field of view monocular imaging system.

In various embodiments, the first sensor system comprises a three-dimensional radar imaging system and the second sensor system comprises a three-dimensional stereoscopic imaging system and/or a wide field of view monocular imaging system.

In various embodiments, the first sensor system comprises a three-dimensional stereoscopic imaging system and the second sensor system comprises a three-dimensional radar imaging system and/or a wide field of view monocular imaging system.

In various embodiments, the system further comprises a third sensor system comprising one or more third sensors providing third sensor data used to establish a third field of view overlapping the first field of view and the at least one processor is configured to also process the third sensor data to track and follow a leader within the first, second, and third fields of view.

In various embodiments, the first sensor system comprises a three-dimensional stereoscopic imaging system, the second sensor system comprises a three-dimensional radar imaging system, and the third sensor system comprises a wide field of view monocular imaging system.

In various embodiments, the system further comprises a sensor module including a cover encasing at least one first sensor from the one or more first sensors and at least one second sensor from the one or more second sensors.

In various embodiments, the at least one first sensor includes at least one antenna of a three-dimensional radar imaging system and the cover includes a radome area formed of material transparent to radio waves of the at least one antenna.

In various embodiments, the sensor module further includes a mounting plate to which the cover attaches and the mounting plate is configured to couple to a vehicle.

In various embodiments, the vehicle is a follower vehicle comprising a navigation system responsive to the first sensor data and second sensor data to track and follow the leader.

In various embodiments, the sensor module further includes a user interface comprising at least one user interface mechanism operable by the leader to initiate a pairing operation to pair the leader with the sensor system and/or vehicle.

In various embodiments, the user interface comprises a biometric sensor configured to collect biometric information associated with the leader and used by the at least one processor in the pairing operation to acquire the leader.

In accordance with another aspect of the inventive concepts, provided is a vehicle comprising a sensor system as provided in any one or more of the paragraphs above.

In various embodiments, the vehicle is a follower vehicle comprising a navigation system responsive to the first sensor data, the second sensor data, and, optionally, the third sensor data to track and follow the leader.

In accordance with another aspect of the inventive concepts, provided is a sensor system, comprising a plurality of sensor systems providing a plurality of different types of imaging sensor data to provide a plurality of fields of view and at least one processor configured to process the plurality of types of sensor data to track and follow a leader within the plurality of fields of view.

In various embodiments, the plurality of fields of view includes overlapping fields of view.

In various embodiments, the overlapping fields of view have different angular widths.

In various embodiments, the plurality of sensor systems comprises at least two sensors chosen from a group consisting of a three-dimensional stereoscopic imaging system, a three-dimensional radar imaging system, and a wide field of view monocular imaging system.

In various embodiments, the plurality of sensor systems comprises at least a three-dimensional stereoscopic imaging system, a three-dimensional radar imaging system, and a wide field of view monocular imaging system.

In various embodiments, the plurality of sensor systems comprises at least a three-dimensional radar imaging system and a wide field of view monocular imaging system.

In various embodiments, the plurality of sensor systems comprises at least a three-dimensional stereoscopic imaging system and a three-dimensional radar imaging system.

In various embodiments, the plurality of sensor systems comprises at least a three-dimensional stereoscopic imaging system and a wide field of view monocular imaging system.

In accordance with another aspect of the inventive concepts, provided is a sensor module apparatus, comprising a plurality of different types of imaging sensors configured to collect a plurality of different types of sensor data to provide a plurality of fields of view and a cover configured to encase the plurality of different types of imaging sensors in a module.

In various embodiments, the plurality of fields of view includes at least two overlapping fields of view.

In various embodiments, the overlapping fields of view have different angular widths.

In various embodiments, the plurality of different types of imaging sensors includes at least two different types of imaging sensors.

In various embodiments, the plurality of different types of imaging sensors includes at least three different types of imaging sensors.

In various embodiments, the plurality of different types of imaging sensors comprises at least two sensors chosen from a group consisting of at least one three-dimensional stereoscopic imaging sensor, at least one three-dimensional radar imaging sensor, and at least one wide field of view monocular sensor.

In various embodiments, the plurality of different types of imaging sensors comprises at least at least one three-dimensional stereoscopic imaging sensor, at least one three-dimensional radar imaging sensor, and at least one wide field of view monocular camera.

In various embodiments, the plurality of different types of imaging sensors comprises at least at least one three-dimensional radar imaging sensor and at least one wide field of view monocular camera.

In various embodiments, the plurality of different types of imaging sensors comprises at least at least one three-dimensional stereoscopic imaging sensor and at least one three-dimensional radar imaging sensor.

In various embodiments, the plurality of different types of imaging sensors comprises at least at least one three-dimensional stereoscopic imaging sensor and at least one wide field of view monocular camera.

In various embodiments, the apparatus further comprises a mounting plate configured to receive the cover and to mount the module to a vehicle or surface.

In accordance with another aspect of the inventive concepts, provided is a leader tracking method, comprising providing a plurality of different types of sensor systems, establishing a plurality of fields of view using the plurality of different types of sensor systems, and tracking a leader within and among the different fields of view using sensor data from at least one of the plurality of different types of sensor systems.

In various embodiments, the method further comprises providing a sensor module including the plurality of different types of sensors from the plurality of different types of sensor systems, wherein the sensor module is coupled to or forms part of a follower vehicle and navigating the vehicle to follow the leader using sensor data from the plurality of different types of sensors.

In various embodiments, the follower vehicle comprises a chassis, a drive mechanism supported by the chassis and arranged to drive a plurality of wheels, a body supported by the chassis, and at least one processor.

In various embodiments, the plurality of different types of sensor systems includes a 3D stereo ranging system, wide field-of-view monocular camera, and 3D radar ranging system, and the method further comprises detecting the leader leaving the field of view of the 3D stereo ranging system, tracking the leader using the wide field-of-view monocular camera, and rotating the follower vehicle such that the leader is within the field of view of the 3D radar ranging system after it has left the field of view of the 3D stereo ranging system.

In various embodiments, the method further comprises acquiring the leader as a prerequisite to tracking the leader.

In various embodiments, acquiring the leader includes performing a pairing operation between the leader and the vehicle and storing characteristics associated with the leader.

In various embodiments, the plurality of different types of sensor systems comprises a 3D radar system and a wide field-of-view monocular camera.

In various embodiments, the plurality of different types of sensor systems comprises a 3D stereoscopic system and a wide field-of-view monocular camera.

In various embodiments, the plurality of different types of sensor systems comprises a 3D stereoscopic system and a 3D radar system.

In various embodiments, the plurality of different types of sensor systems comprises a 3D stereoscopic system, a 3D radar system, and a wide field-of-view monocular camera.

In various embodiments, the different fields of view have different angular widths.

Those skilled in the art will appreciate that the features provided in the above statements can be combined in a variety of ways without departing from the spirit and scope of the inventive concepts.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DESCRIPTION OF EMBODIMENTS

Figure 1:
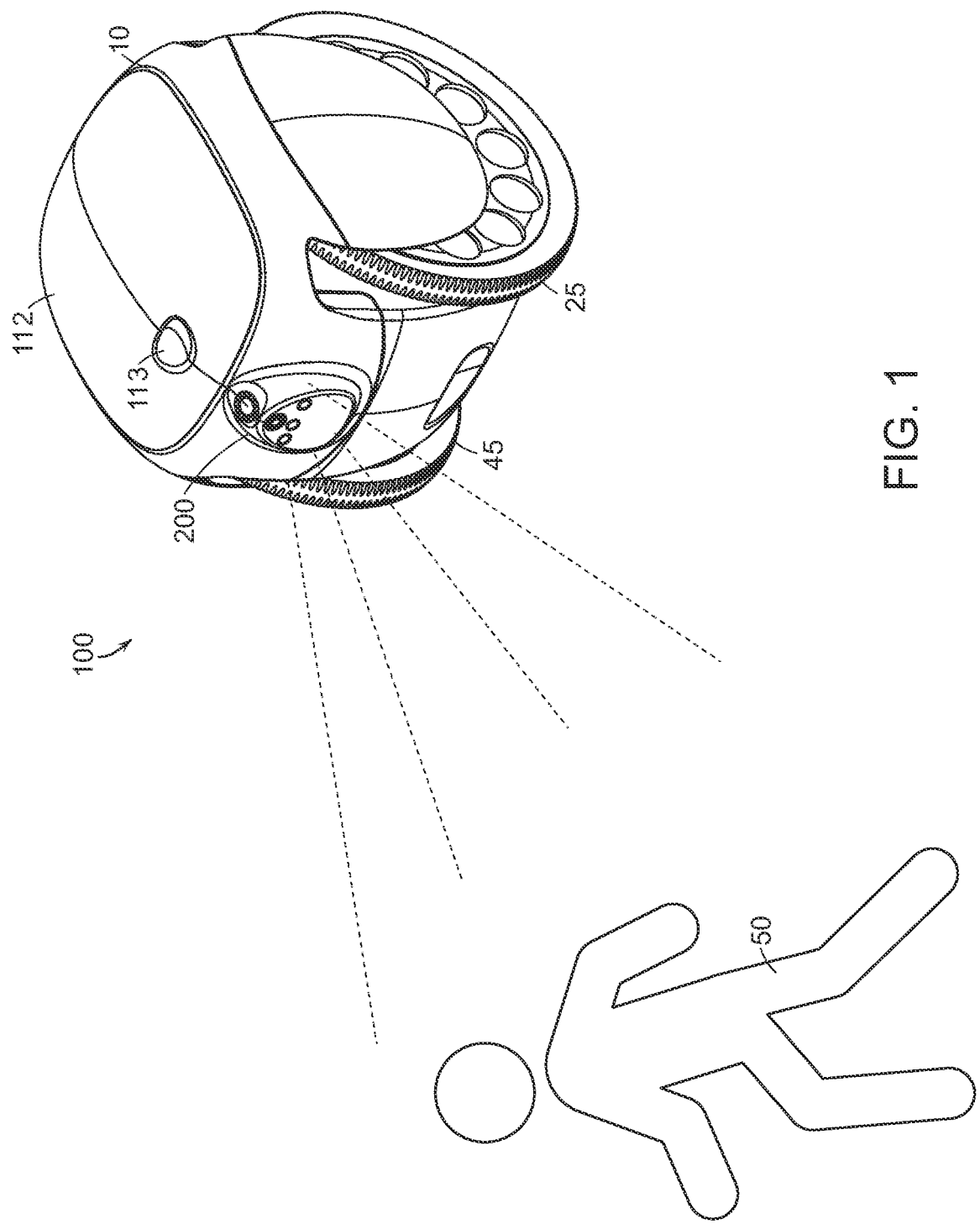
FIG. 1 is a front perspective view of an embodiment of a follower vehicle, in accordance with aspects of inventive concepts.

Various aspects of the inventive concepts will be described more fully hereinafter with reference to the accompanying drawings, in which some exemplary embodiments are shown. The present inventive concepts may, however, be embodied in many different forms and should not be construed as limited to the exemplary embodiments set forth herein.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present inventive concepts. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing.

To the extent that functional features, operations, and/or steps are described herein, or otherwise understood to be included within various embodiments of the inventive concepts, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

FIGS. 1 through 5 provide different views of an embodiment of a follower vehicle comprising a sensor system in accordance with aspects of the inventive concepts. As used herein, a "follower" vehicle is a self-driving vehicle equipped and configured to follow a moving "leader" 50. The leader 50 can be, as examples, a human, a vehicle, a mobile robot, or an autonomous vehicle. As a follower vehicle, the capability to acquire and track the leader is useful to follow the leader. In the embodiments used herein, the follower vehicle is a land-based vehicle, but in other embodiments the follower vehicle could be an aircraft, a watercraft vehicle, or a combination of land, water, and/or air vehicle, such as an air and land vehicle or an amphibious vehicle.

To "acquire" a leader 50, the follower vehicle and/or its sensor system is paired with the leader. A follower vehicle can be paired with the leader by recognizing the leader distinctly through data acquired via the sensor system or via user input device, or combination thereof. The data used for pairing, therefore, could be image data from image sensors and/or biometric data from other user interface devices, in various embodiments. In some embodiments, the follower vehicle could pair with the leader through electronic communications, either wired or wireless. As an example, in some embodiments, it may be possible for the follower vehicle and leader to pair using infrared, Bluetooth®, or other short range wireless communication technology. (The trademark Bluetooth is owned by Bluetooth SIG Inc.) In some embodiments, it may be possible for the follower vehicle to pair with the leader using one technology, but then to track and/or follow using at least one other technology.

Figure 2:
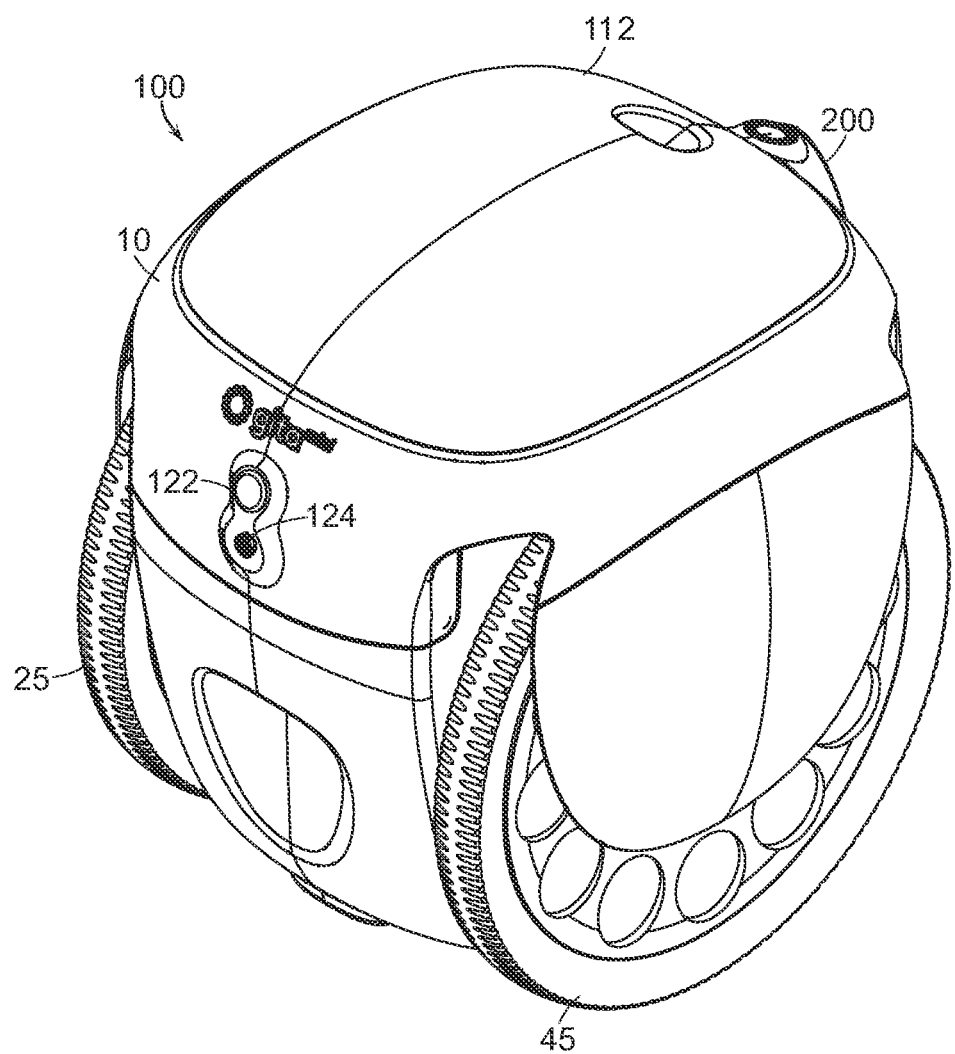
FIG. 2 is a rear perspective view the follower vehicle embodiment of FIG. 1, in accordance with aspects of inventive concepts.
Figure 3:
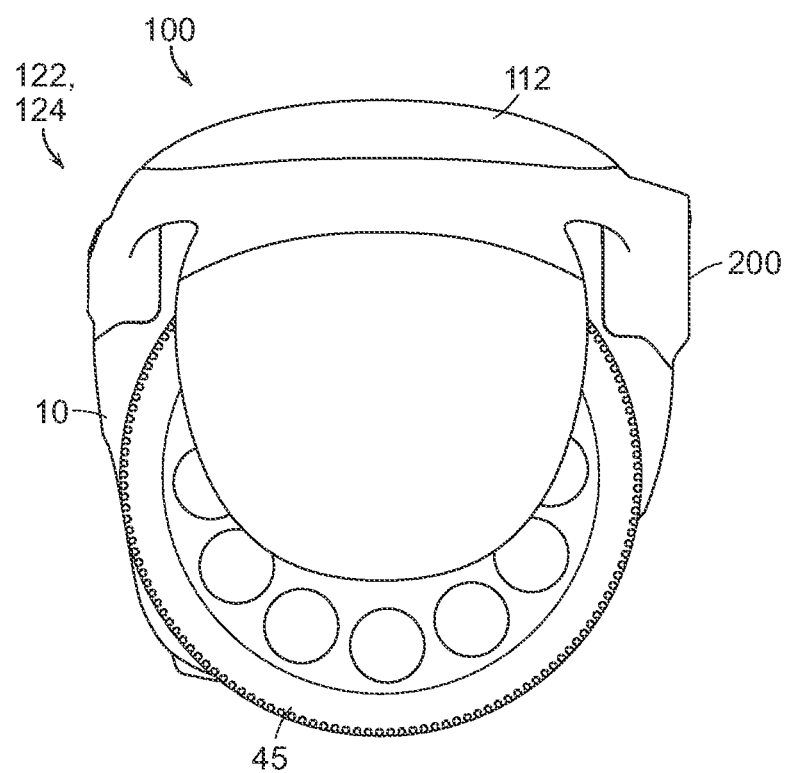
FIG. 3 is a left side view of the follower vehicle embodiment of FIG. 1, in accordance with aspects of inventive concepts.
Figure 4:
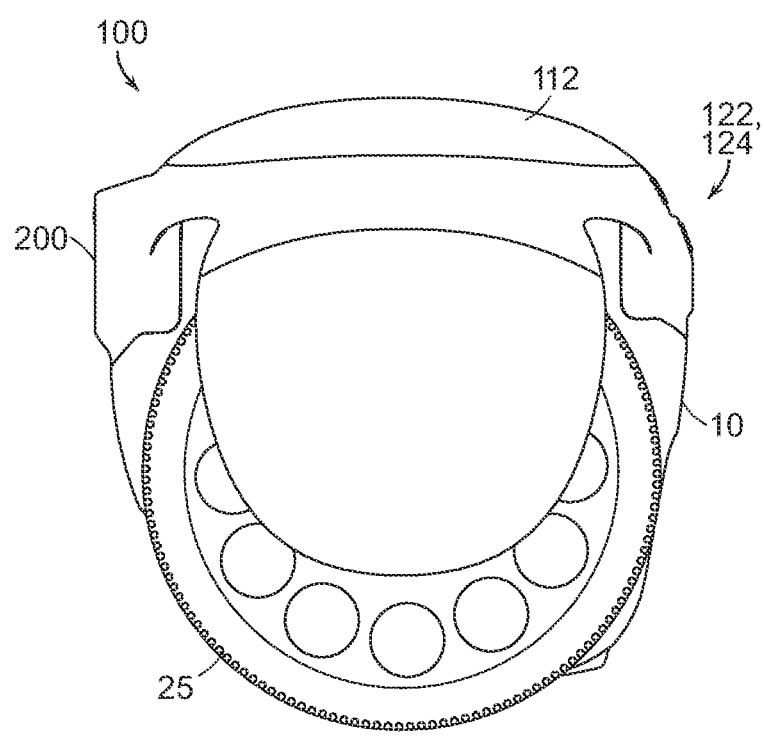
FIG. 4 is a right perspective view of the follower vehicle embodiment of FIG. 1, in accordance with aspects of inventive concepts.
Figure 5:
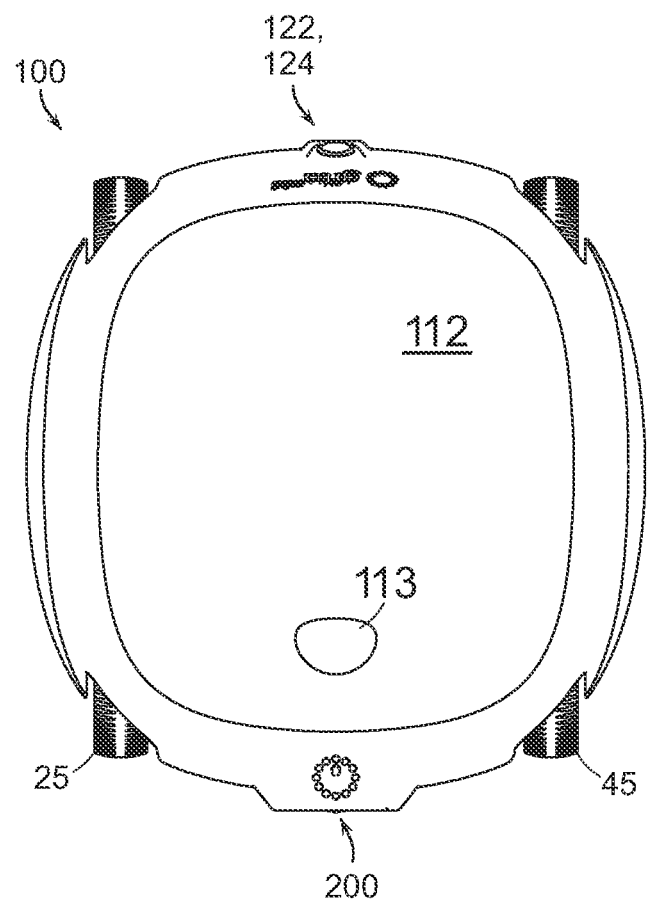
FIG. 5 is a top view of the follower vehicle embodiment of FIG. 1, in accordance with aspects of inventive concepts.

FIG. 1. is a front perspective view of an embodiment of a follower vehicle 100, in accordance with aspects of inventive concepts. FIG. 2 is a rear perspective view the embodiment of FIG. 1, in accordance with aspects of inventive concepts. FIG. 3 is a left side view of the embodiment of FIG. 1, in accordance with aspects of inventive concepts. FIG. 4 is a right perspective view of the embodiment of FIG. 1, in accordance with aspects of inventive concepts. And FIG. 5 is a top view of the embodiment of FIG. 1, in accordance with aspects of inventive concepts.

In some embodiments, such as the one shown in FIG. 1, the follower vehicle 100 comprises a chassis (not shown), a drive mechanism (not shown) supported by the chassis and arranged to drive a plurality of wheels 25,45, and a body 10 supported by the chassis. While not essential, in some embodiments, the body 10 may include or define an internal volume. The internal volume could be configured to hold, support, carry and/or store any of a variety of types of goods or systems. In some embodiments, the follower vehicle 100 can be a robotic follower vehicle that can identify and acquire a leader 50, e.g., a human, and then track and follow the leader.

In some embodiments, such as the one shown in FIG. 1, the follower vehicle 100 comprises an opening in the body 10 that provides access to the internal volume, which can be covered by a lid 112. In some embodiments, the follower vehicle 100 comprises a rim formed within the opening and including a support surface configured to receive and support a removable payload in the internal volume. In some embodiments, the carrier lid 112 can be constructed and arranged to provide an airtight, watertight and/or thermal seal of the opening. In some embodiments, the lid can include a grip 113, a structure or apparatus configured for easy opening and/or closing of the lid. In some embodiments, the grip 113 can take the form of or include a depression in the contour of the lid.

In some embodiments, such as the one shown in FIGS. 1 and 2, the plurality of wheels is two wheels, which can include a first wheel 25 and a second wheel 45, which are partially encased by the body 10 in this embodiment. In this embodiment, the first wheel 25 and the second wheel 45 are disposed on opposite sides of the vehicle body 10. In other embodiments, the number of wheels and arrangement of wheels could be different. In still other embodiments, the follower vehicle may not include wheels.

In some embodiments, each wheel 25, 45 may also include a rim substantially defining an outer surface of the wheel 25, 45. In some embodiments, a tire may be disposed around each rim. The tires may be removably mounted to the respective rims, such that each tire rotates with its rim. The tire may be made from a rubber, polymer, or any other suitable material. The tire may be solid or fluid filled. The tires may provide frictional contact between the wheel 25, 45 and a ground surface to enhance the performance of the vehicle 100.

In the embodiment of FIGS. 1-5, the vehicle 100 includes at least one sensor system, including at least one sensor module 200. The at least one sensor module 200 can include one or more types of sensors configured to track and follow a leader. In some embodiments, the at least one sensor module is a plurality of sensor modules. In some embodiments, the at least one sensor module includes a sensor module that integrates a plurality of different sensor types. In some embodiments, the plurality of different sensor types includes one or more sensors chosen from a group consisting of monocular cameras, stereo cameras, radar, infrared sensors, lidar sensors, and/or ultrasound sensors. In this embodiment, the sensor module 200 is located at the front of the follower vehicle and is generally forward looking as the vehicle travels in a forward direction.

Referring to FIG. 2, the vehicle 100 can also include a power button 122 and a charging port 124. In this embodiment, the power button 122 and the charging port 124 are located at the rear of the vehicle 100. In various embodiments, the vehicle includes a rechargeable battery power source (not shown), which can be recharged via the charging port 124.

In some embodiments, the vehicle 100 comprises at least one sensor configured to characterize its environment and track a leader, such as a human. As will be described herein, various embodiments of sensor combinations can be used to track and follow a leader, preferably leveraging the strengths of different types of sensors in combination. Various embodiments include the use of radar with other types sensors in the context of the follower vehicle 100 of FIGS. 1-5 including at least one sensor module 200.

Figure 6:
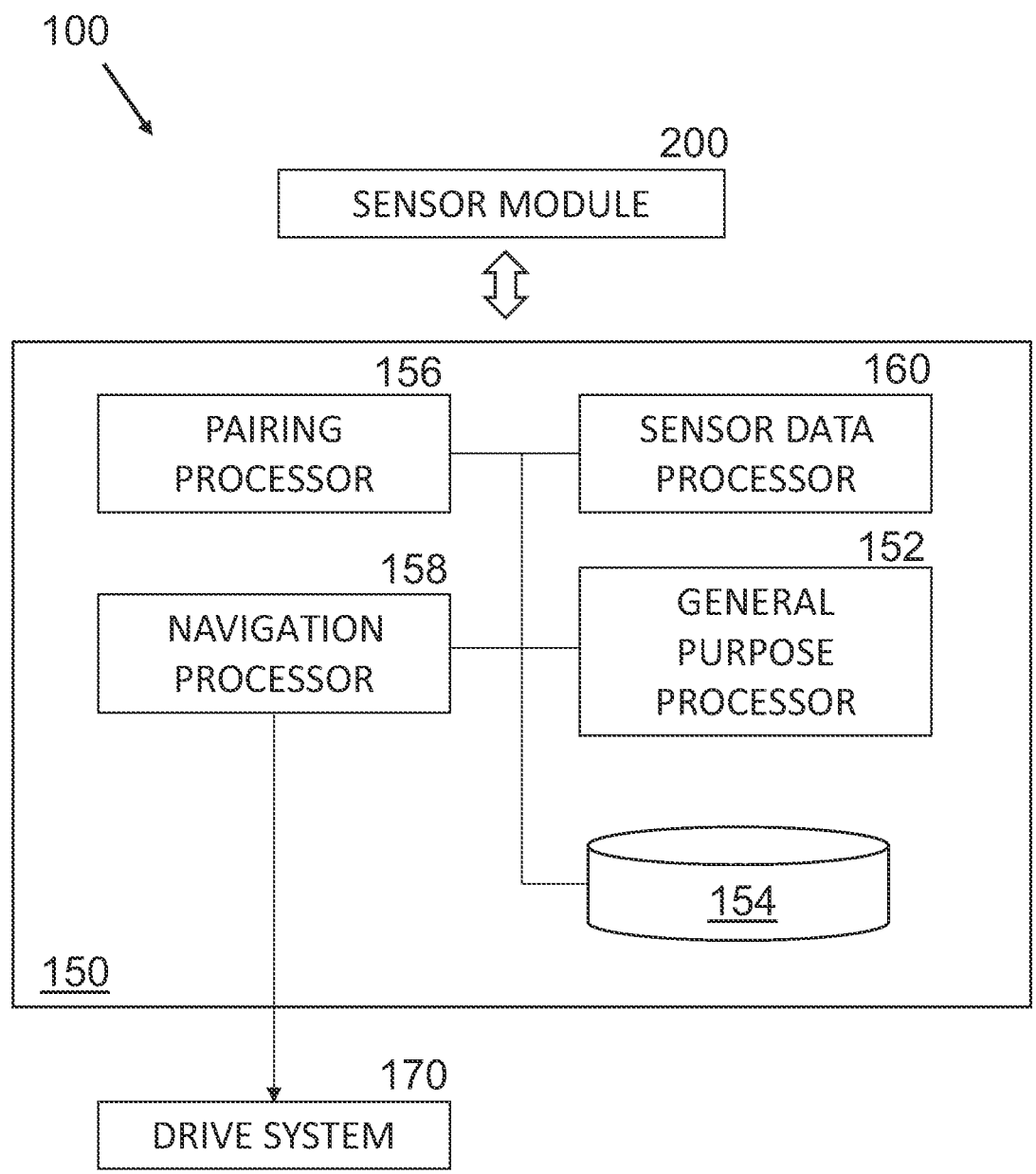
FIG. 6 is an embodiment of a functional block diagram of the follower vehicle embodiment of FIG. 1, in accordance with aspects of inventive concepts.

FIG. 6 is an embodiment of a functional block diagram of the follower vehicle embodiment 100 of FIGS. 1-5, in accordance with aspects of inventive concepts. Various core computer storage and processing elements 150 can be provided for storing and processing computer instructions and data useful in the various operations of the follower vehicle 100. The sensor module 200 can be configured to provide sensor data to the core 150. The core 150 can be configured to control the sensor module 200 and drive system 170, based on sensor data and any other inputs from other input devices, including user input devices, of the follower vehicle 100.

A general-purpose processor 152 can be configured to perform the primary and ancillary or complementary processing and control of the vehicle 100. At least one computer storage device and/or computer storage system 154 can be included to store executable computer code used by the general-purpose processor 152 or any other processor of the vehicle. Computer storage 154 can also be configured to store data associated with the operation, configuration, and/or data recording of the sensors and the vehicle.

A special purpose pairing processor 156 can be included to affect the pairing of the leader and follower, using sensor data and/or user interface data, e.g., a button. A sensor data processor 160 can be included to control, operate, and process the sensor data acquired by the sensors of the sensor system, including the sensor module 200. Such processing can include, but is not limited to, preprocessing, post-processing, analyzing, and/or storing sensor data. A navigation processor 158 can be included to control the drive system 170. The navigation system can utilize sensor data, e.g., processed by the sensor data processor 160 and/or general-purpose processor 152, to track and follow the leader after, e.g., after pairing. In various embodiments, the sensor system can include the sensor module 200 (as well as other sensors that could form part of the operational system of the vehicle), sensor data processor 160, and at least a portion of the computer storage 154.

With respect to the various types of sensors that can be included in the sensor system and/or sensor module 200, optical imaging systems using electronic image sensors provide high resolution color and intensity information representing a 3-D scene projected onto the image plane. The image representation is typically divided into picture elements (pixels) arranged as a rectangular array. Modern solid-state sensors can supply tens of megapixels resolutions. Typical consumer CMOS sensors range from 5-20 megapixels, and industrial grade sensors range from 1-10 megapixels. Many applications require an understanding of the range to each element in the scene, which represents the third dimension of the image, the "depth". There are two commonly used technologies for achieving depth information using optical imaging.

The first is called Time-of-Flight (TOF) imaging. In this type of system, a bright infrared light is flashed from a location proximate to the image sensor along the same viewing axis to the scene. Each pixel in the sensor measures the time from the activation of the flash until the reflected light is received at the pixel to provide an estimate of the distance to portion of the scene. There are numerous disadvantages to this type of system, including high power requirements, low resolution, and range.

The second is called stereoscopic ranging. In this type of system, two identical cameras are arranged in a fixed and stable relationship. Two images are captured simultaneously, and the resulting images are compared pixel by pixel to provide a 2-D image representation along with a range estimate for each pixel determined by measuring the pixel disparity between the two cameras for features in the scenes. Stereoscopic cameras can use any image sensor, so the quality of the image can be achieved for the application, and they do not require the flashing of a bright light, so they consume less power than TOF cameras. Also, the range and precision can be optimized by selecting the resolution of the imager and the distance between them in the apparatus.

Radar systems employ radio frequency (RF) signal emissions and reflections to identify the range to a target. Multiple antenna systems can provide range to targets along with X, Y or elevation and azimuth information. Modern solid state radar systems can provide high resolution imaging providing x, y, z and velocity information for each voxel sensed. Radar systems, however, cannot operate at the same speed as optical systems, do not yet have the same high resolution, and do not provide any information about color in the scene.

Monocular imaging systems cannot by themselves provide range data, but if the target is identifiable, they can provide bearing information. Optimizing the performance of a ranging imager generally requires its FOV to be limited to 90 degrees or less. In situations where the leader moves to the side of the FOV of the 3D ranging system, the angular bearing can still be determined in the wide FOV monocular camera to allow the vehicle to be rotated to the right heading to recapture the leader in the 3D sensor FOV.

FIGS. 7 through 18 describe aspects and embodiments of a sensor module 200 and/or components thereof as examples of various sensor module embodiments that can be used onboard a follower vehicle 100 to efficiently and effectively track and follow a leader. FIGS. 7A through 7C show different fields of view (FOVs) that can be provided by different types of sensors that can be included in or form part of sensor module 200. The different fields of view can be overlapping fields of view and can have different angular widths, depending on the configuration of the sensor module.

Figure 7A:
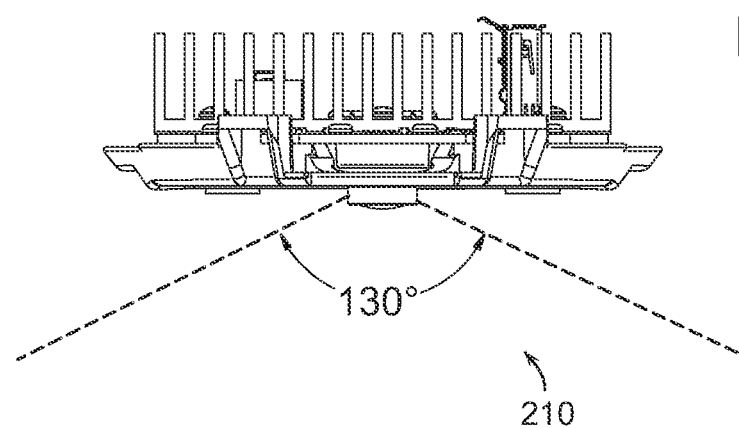
FIG. 7A is a top view of an embodiment of a portion of a sensor system comprising a monocular imaging system characterized as having a horizontal field-of-view of about 130 degrees, in accordance with aspects of inventive concepts.

FIG. 7A is a top view of a portion of an embodiment of the sensor module 200 comprising a monocular imaging system 210 (comprising a wide field of view camera 212) that is characterized as having a horizontal field-of-view of about 130 degrees, in accordance with aspects of inventive concepts. In alternative embodiments, the monocular imaging system 210 can be characterized as having a horizontal field-of-view with a different range.

Figure 7B:
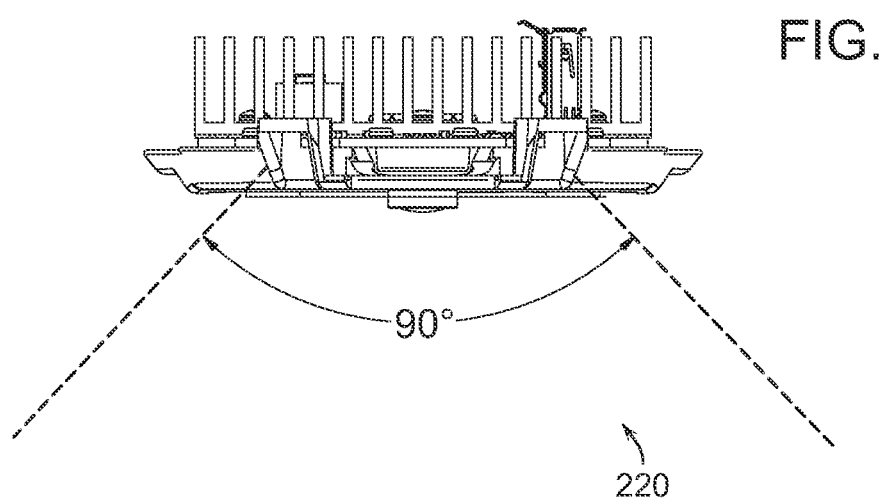
FIG. 7B is a top view of an embodiment of a portion of a sensor system comprising a stereoscopic imaging system characterized as having a horizontal field-of-view of about 90 degrees, in accordance with aspects of inventive concepts.

FIG. 7B is a top view of a portion of an embodiment of the sensor module 200 comprising a stereoscopic imaging system 220 (comprising a stereo camera 222) that is characterized as having a horizontal field-of-view of about 90 degrees, in accordance with aspects of inventive concepts. In alternative embodiments, the stereoscopic imaging system 220 can be characterized as having a horizontal field-of-view with a different range.

Figure 7C:
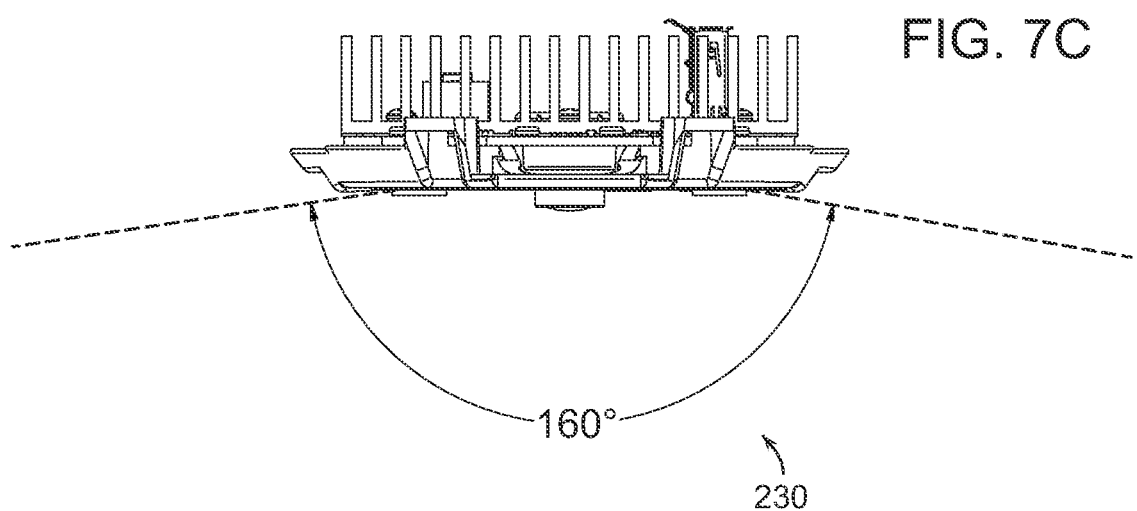
FIG. 7C is a top view of an embodiment of a portion of a sensor system comprising a radar system characterized as having horizontal field-of-view of about 160 degrees, in accordance with aspects of inventive concepts.

FIG. 7C is a top view of an embodiment of the sensor module 200 comprising a radar system 230 that is characterized as having a horizontal field-of-view of about 160 degrees, in accordance with aspects of inventive concepts. In alternative embodiments, the radar imaging system 230 can be that is characterized as having a horizontal field-of-view with a different range.

Described below are various embodiments of a sensor module that utilize different sensor type combinations, e.g., monocular camera, stereo camera, and/or radar. In embodiments where all three sensor types are provided, or where other types of sensors are provided, the physical coexistence of two or more sensor types does not dictate that all sensor types present are needed or used in all tracking and following operations. The vehicle 100 can utilize different combinations of provided, onboard sensors in different environments and/or circumstances to perform tracking and following operations.

Combining 3D Optical imaging with 3D Radio Imaging and Wide FOV monocular imaging In some embodiments, a sensor system includes an optical imaging system employing stereoscopic ranging techniques and a high-resolution multi-antenna radar imaging system to provide robust 3D point clouds under changing environmental conditions. In this embodiment, the sensor module 200 includes a stereoscopic ranging camera system 220 and a 4D (x, y, z, v) radar ranging system 230, including a radar imaging sensor 232. The stereo and radar systems 220, 230 are placed near each other on the vehicle 100 and have similar and overlapping fields-of-view (FOV), see FIGS. 7B and 7C. An additional wide FOV monocular imaging camera system 210 can be included to provide bearing information when the leader steps outside the FOV of the 3D sensors. For example, the FOV of the monocular camera can be as shown in FIG. 7A.

In this embodiment, the use of a stereoscopic ranging optical imaging system 220, a 4D radar ranging sensor 230, and a wide FOV monocular system 210 are combined. All sensors supply information to the tracking system, e.g., core 150, of the vehicle 100. The tracking system monitors the point information along with the image information to calculate the location of the leader 50 with respect to the vehicle 100. In the event that one sensor or the other is compromised by some external factor, such as sunlight, the other sensor(s) can still provide adequate information to maintain operation until the disturbance is removed. In situations where the leader moves to the side of the FOV of the 3D ranging systems, the angular bearing can still be determined in the wide FOV monocular camera to allow the vehicle to be rotated to the right heading to recapture the leader in the 3D sensor FOV.

Figure 8A:
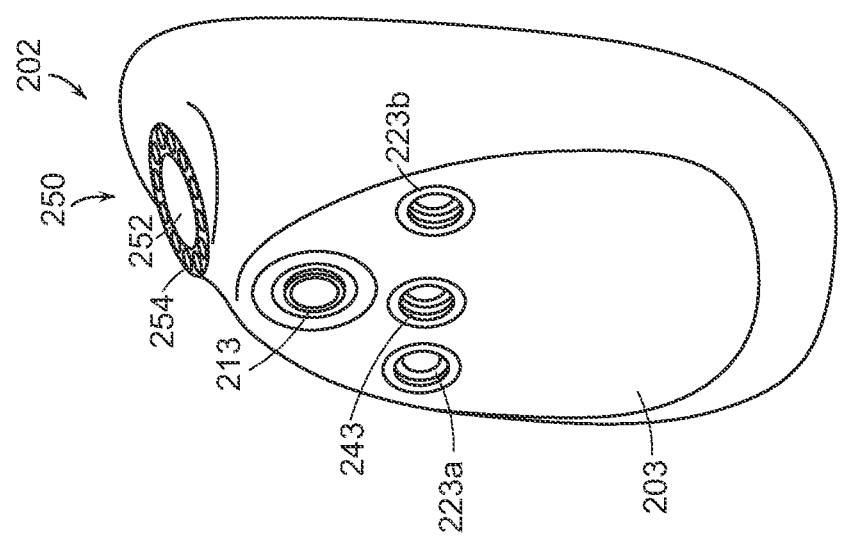
FIG. 8A is a front perspective view of an embodiment of a sensor module, in accordance with aspects of inventive concepts.
Figure 8B:
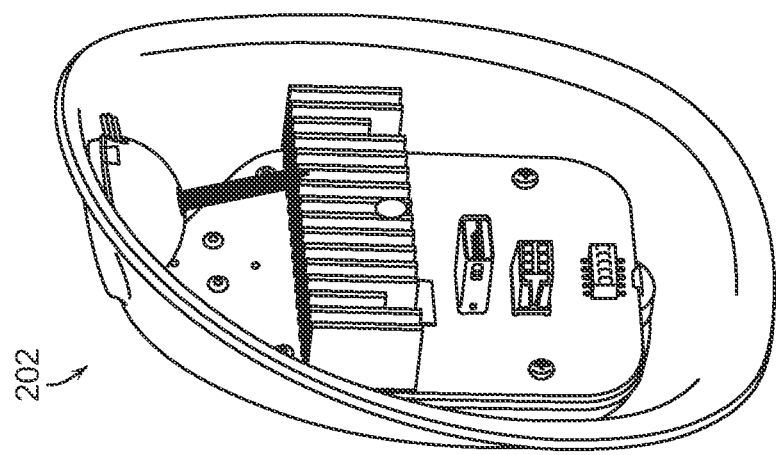
FIG. 8B is a rear perspective view of the sensor module of FIG. 8A, in accordance with aspects of inventive concepts.

FIG. 8A is a front perspective view of an embodiment of sensor module 200, in accordance with aspects of inventive concepts. FIG. 8B is a rear perspective view of the sensor module of FIG. 8A, in accordance with aspects of inventive concepts. In each view, a sensor module cover 202 is shown as a structural element that houses and protects internal elements of the sensor module, including electronics, connectors, lenses, and/or antennas of the various sensors and user interface devices comprising various embodiments of the sensor module 200.

In these views, the sensor module 200 includes a stereoscopic ranging camera system 230, wherein stereo camera lens covers 223a, 223b are shown. The sensor module 200 also includes a monocular camera system 210, wherein a monocular camera lens 213 is shown. In this embodiment, the sensor module 200 also includes an infrared (IR) pattern projector 240, as a light source, wherein an IR transparent lens cover 243 is shown.

In those embodiments in which the sensor module 200 includes radar, the cover 202, or at least portions thereof, can include a radome area 203 of a radar imaging system 230. The radome area 203 can be formed of material transparent to radio waves, and configured to protect radar equipment internal to the sensor module 200. If the sensor module included lidar or ultrasound equipment, then the cover 202 would have to be appropriately formed, as would be understood by those skilled in the art.

In this embodiment, the cover 202 also includes at least one user interface 250, in accordance with aspects of inventive concepts. In the embodiment shown, the user interface 250 comprises at least one button 252 and at least one light 254. In the embodiment shown, the at least one button comprises a circular-shaped button 252. In alternative embodiments, the button 252 could have a different shape including, but not limited to, a square, a rectangle, a triangle, or any such suitable polygon or combinations thereof. In some embodiments, the sensor module could comprise a plurality of buttons. In some embodiments, the user interface 250 and/or the at least one button 252 can include a biometric sensor, such as a fingerprint scanner, retinal scanner, or other biometric sensor.

In the embodiment shown, the user interface 250 comprises one button 252. In alternative embodiments, the user interface 250 comprises a different number of buttons 252.

In some embodiments, the user interface 250 comprises one or more lights 254. In the embodiment shown, the one or more lights 254 comprises a ring of lights encircling the circular-shaped button 252. In alternative embodiments, the one or more lights 254 comprises a different shape or pattern of lights including, but not limited to, a square, a rectangle, a triangle, or any such suitable polygon or combinations thereof. The light pattern could correspond to the shape of the one or more buttons 252.

In various embodiments, pairing the follower vehicle 100 and leader 50 is accomplished by the leader being in front of the vehicle 100, and sensor module 200, when the button 252 is pressed (or otherwise engaged). When pairing is complete, and the vehicle has acquired the leader, the ring of lights 254 is illuminated and the follower vehicle 100 utilizes the sensor system (including the sensor module 200) to track and follow the leader.

The leader 50 can be identified, tracked and followed by its trajectory, relative size, shape, color etc. The more information available about the leader to the core system 150, the more dependable the following operation of the vehicle 100. In various embodiments, the follower vehicle 100 employs camera sensors for tracking the leader 50. These sensors can be affected by bright sunlight, darkness, rain, fog, etc. Also, the more potential targets in a scene, the harder it is for the system to differentiate the targets to select the "right" one, i.e., the leader. Sensor system and sensor module embodiments in accordance with aspects of the inventive concepts integrate multiple sensor technologies to overcome the shortcomings of a monolithic system.

The rear perspective view of FIG. 8B shows various electronics housed within the cover 202, according to various embodiments. Embodiments of the electronics will be discussed below.

Figure 9A:
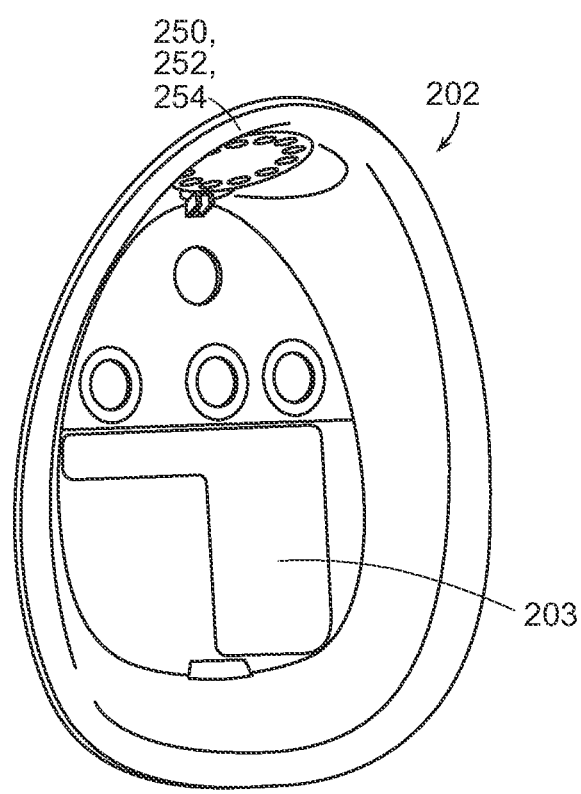
FIG. 9A is a rear perspective view of an embodiment of a sensor module cover, in accordance with aspects of inventive concepts.
Figure 9B:
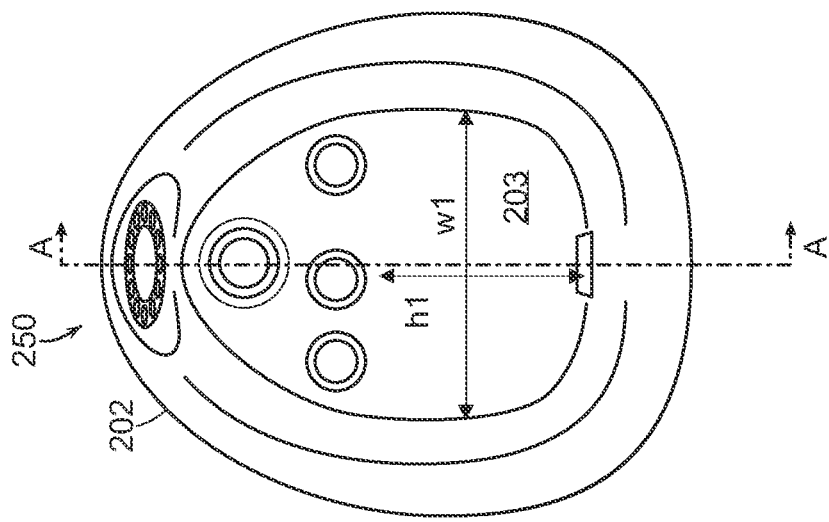
FIG. 9B is a front view of the sensor module cover of FIG. 9A, in accordance with aspects of inventive concepts.
Figure 9D:
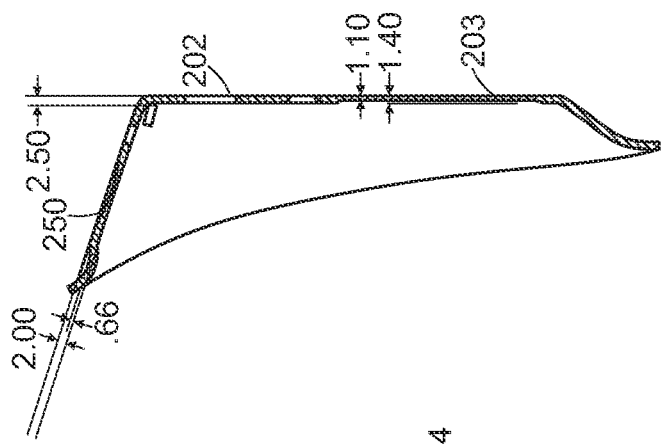
FIG. 9D is a cross-sectional view of the sensor module cover of FIG. 9A, in accordance with aspects of inventive concepts.
Figure 9C:
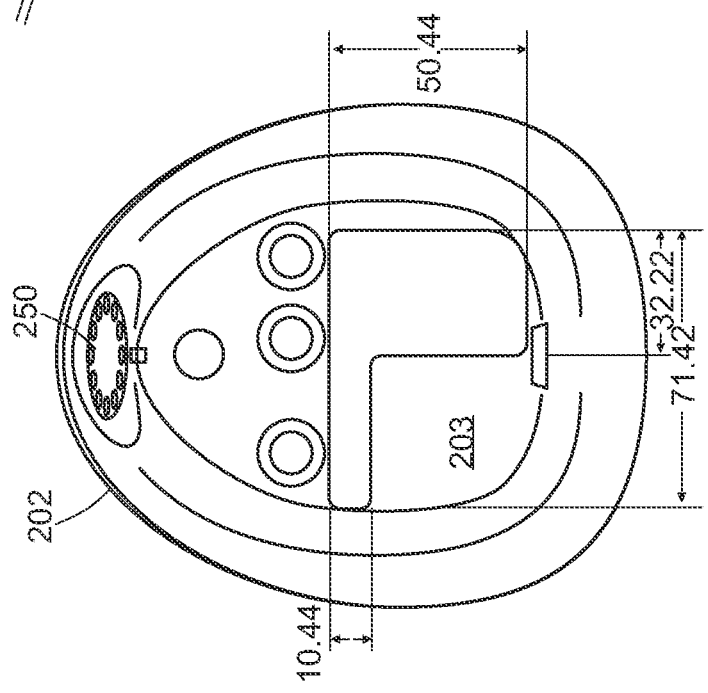
FIG. 9C is a rear view of the sensor module cover of FIG. 9A, in accordance with aspects of inventive concepts.

FIGS. 9A-9D depict various views of an embodiment of the sensor module cover 202, in accordance with aspects of inventive concepts. FIG. 9A is a rear perspective view of the sensor module cover 202. FIG. 9B is a front view of the sensor module cover of FIG. 9A. FIG. 9C is a rear view of the sensor module cover of FIG. 9A. FIG. 9D is a cross-sectional view of the sensor module cover of FIG. 9A.

In the embodiment shown, the radome area 203 is formed in a lower portion of the cover 202, with one or more other sensors or devices located above the radome area 203 in an upper portion of the cover 202. In alternative embodiments, the radome area 203 could be at a different location of the cover 202.

In some embodiments, the radome area 203 is 1.1 mm thick, or thereabouts. In alternative embodiments, the radome area 203 can have a different thickness. In some embodiments, the radome area 203 can be about 50 mm high (h1) and about 71.4 mm wide (w1). In alternative embodiments, the dimensions of the radome area 203 can be different.

The cover 202 includes various openings formed therein to accommodate the various camera lenses, as well as UI and other devices, exposed therethrough, as will be apparent from the figures and discussion below.

Figure 10A:
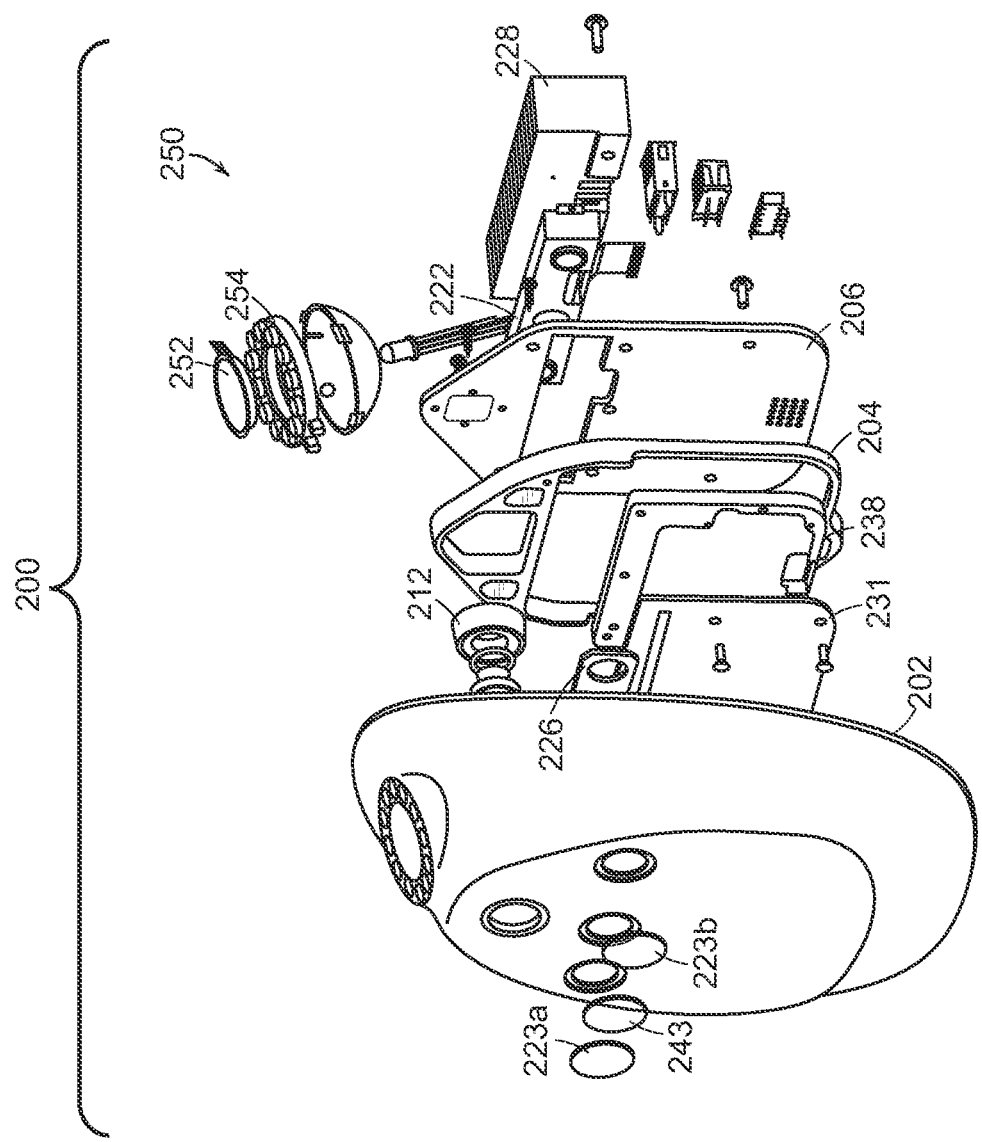
FIG. 10A is an exploded front perspective view of an embodiment of the sensor module of FIGS. 8A and 8B, in accordance with aspects of inventive concepts.
Figure 10B:
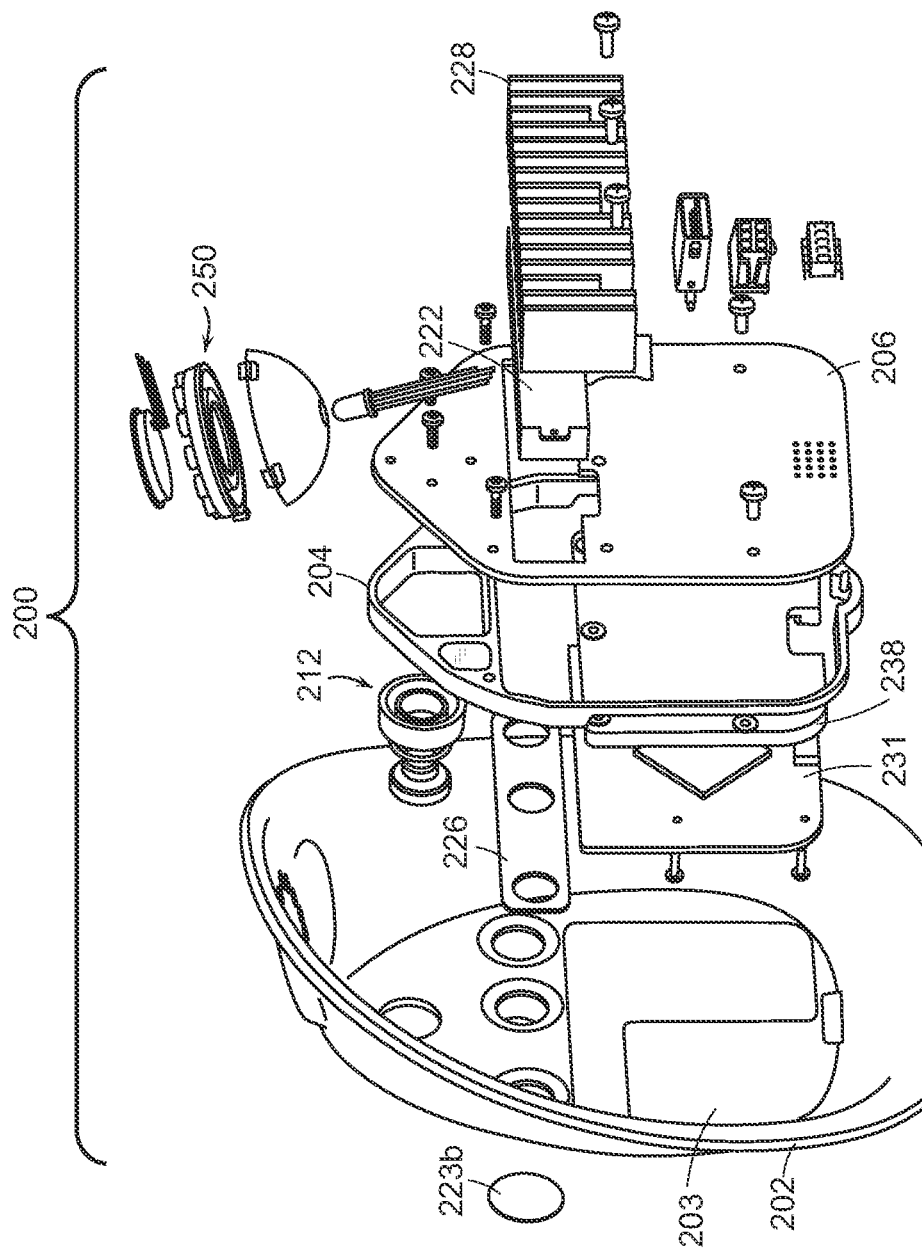
FIG. 10B is an exploded rear perspective view of the sensor module of FIG. 10A, in accordance with aspects of inventive concepts.
Figure 10C:
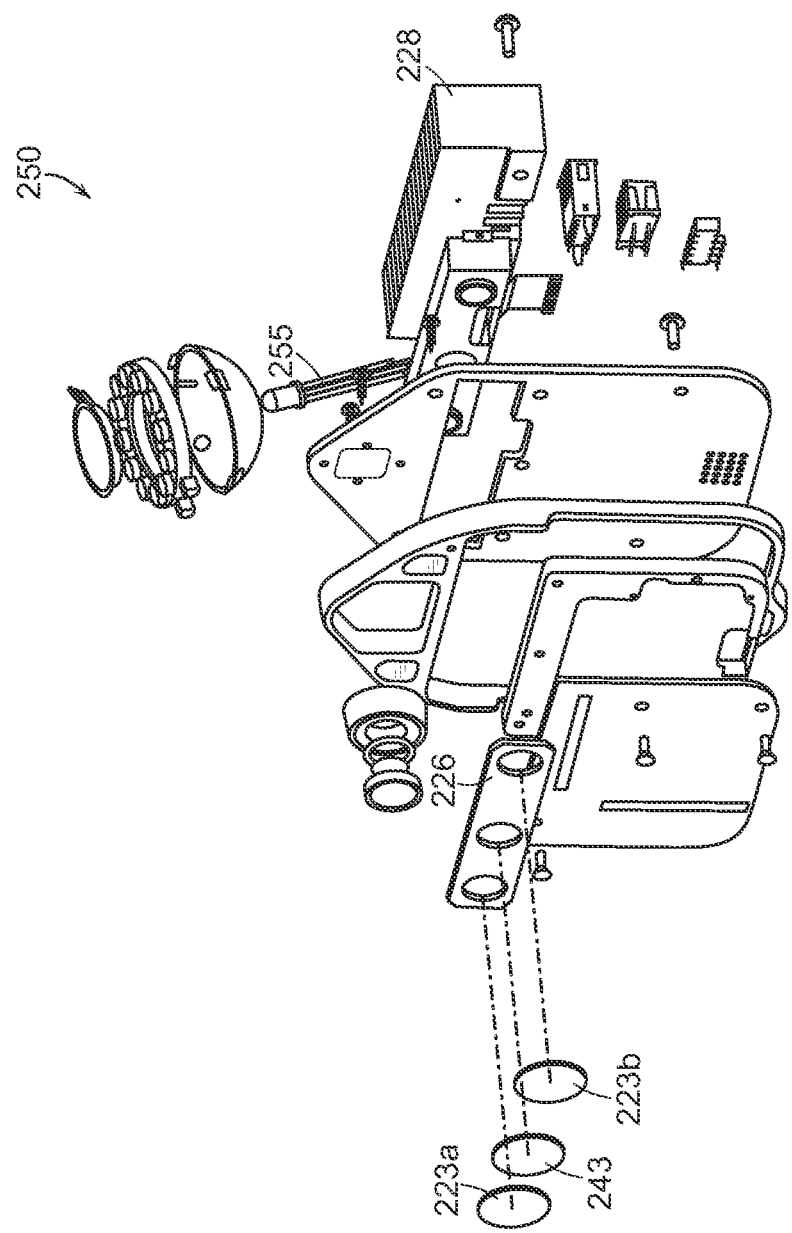
FIG. 10C is an exploded front perspective view of an embodiment of the sensor module of FIG. 10A without the cover, in accordance with aspects of inventive concepts herein.

FIG. 10A is an exploded front perspective view of an embodiment of the sensor module 200 of FIGS. 8A and 8B, in accordance with aspects of inventive concepts. FIG. 10B is an exploded rear perspective view of the sensor module of FIG. 10A, in accordance with aspects of inventive concepts. FIG. 10C is an exploded front perspective view of an embodiment of the sensor module 200 of FIG. 10A without the cover 202, in accordance with aspects of inventive concepts.

These figures show the sensor module 200 comprising the cover 202, UI devices 250, and IR pattern projector 240. The UI devices 250 and IR pattern projector could be part of the sensor module 200 in some embodiments, but in other embodiments one or both could be provided apart from the sensor module. In the embodiments shown, the sensor module 200 further includes the monocular camera system 210, stereoscopic camera system 220, and radar imaging system 230, each capable of producing different fields of views, as shown in the examples of FIGS. 7A-7C. In other embodiments, the sensor module could include a combination of only two of the foregoing, one of the foregoing in combination with a different sensor type, or only the radar imaging sensor, as examples. Other sensor configurations are also possible within the scope of the inventive concepts.

Figure 11B:
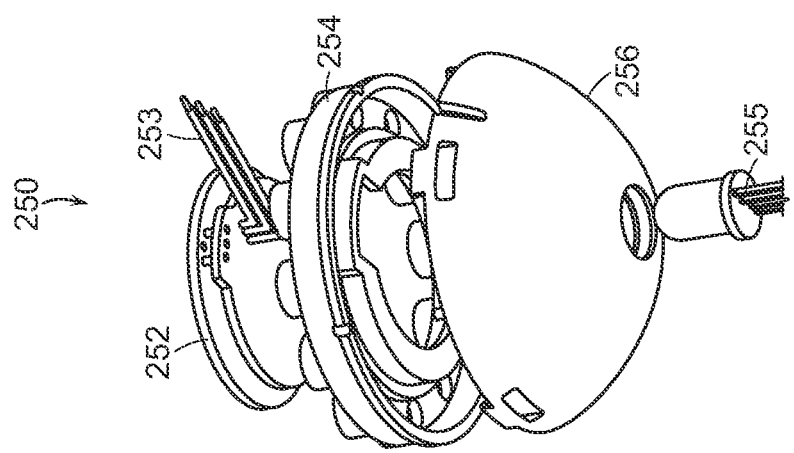
FIG. 11B is an exploded bottom perspective view of an embodiment of the user interface of FIG. 11A, in accordance with aspects of inventive concepts.
Figure 11A:
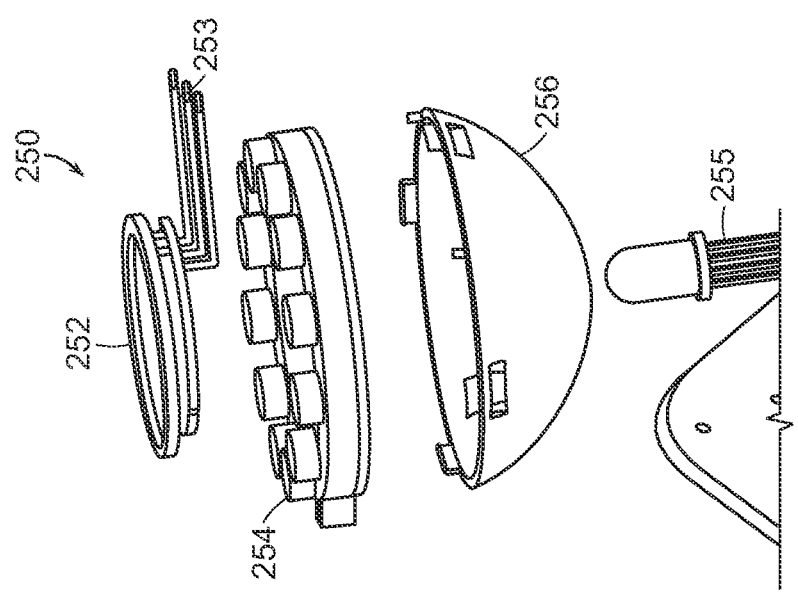
FIG. 11A is an exploded top perspective view of an embodiment of a user interface of the sensor module of FIGS. 10A-10C, in accordance with aspects of inventive concepts.

FIG. 11A is an exploded top perspective view of an embodiment of a user interface 250, in accordance with aspects of inventive concepts. FIG. 11B is an exploded bottom perspective view of an embodiment of a user interface 250, in accordance with aspects of inventive concepts.

As discussed above, in this embodiment, the UI 250 includes a button 254 encircled by a ring of lights 254, e.g., light emitting diodes (LEDS). The UI 250 is used at least in the pairing operation of the vehicle 100. The button 252 includes a printed circuit board (PCB) from which extends leads 253 to communicate with the core 150. A housing 256 is provided to support the button 252 and the lights 254. A set of wires and/or connectors 255 connect through an opening in a bottom of the housing 256 to the lights 254.

FIGS. 12A-12E show different views of an embodiment of internal portions of a sensor module 200, in accordance with aspects of inventive concepts. In these embodiments, the sensor module 200 includes a monocular camera system 210, a stereoscopic camera system 220, and a radar imaging system 230. In the views shown in FIGS. 12A-12E, the cover 202 has been omitted to show the internal components.

In some embodiments, this sensor module 200 configuration (e.g., monocular imaging and stereoscopic imaging and radar imaging) is mounted in a follower vehicle 100 with one or more of the characteristics of the embodiment shown in FIG. 1.

Figure 12A:
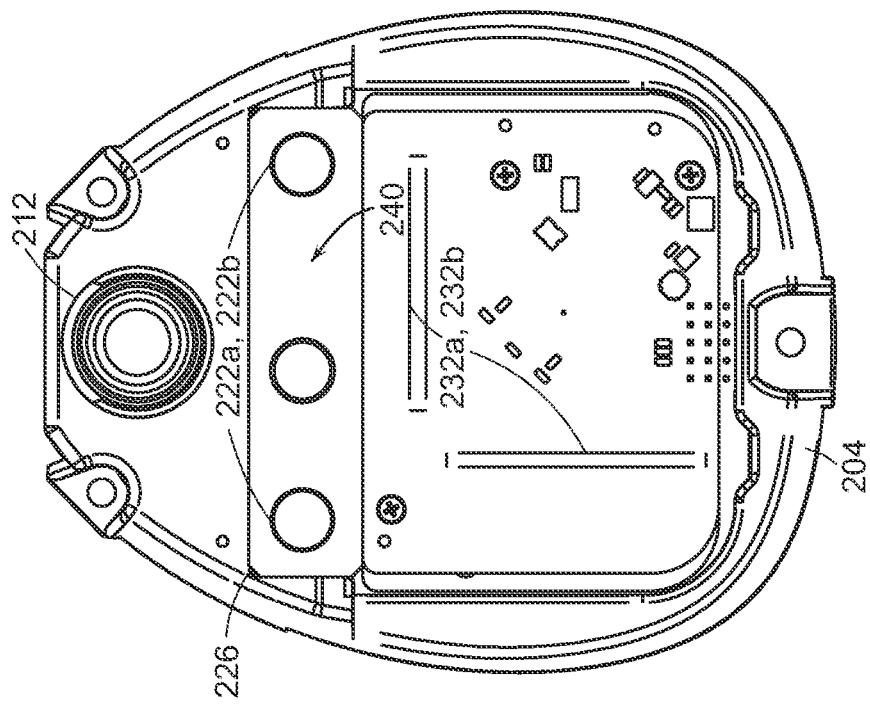
FIG. 12A is a front view of an embodiment of internal portions of a sensor module comprising a monocular imaging system, a stereoscopic imaging system and a radar imaging system, in accordance with aspects of inventive concepts.
Figure 12B:
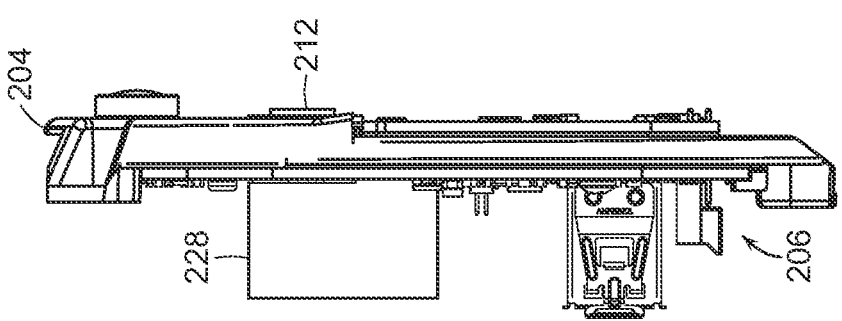
FIG. 12B is a side view of the embodiment of the internal portions of the sensor module of FIG. 12A.
Figure 12E:
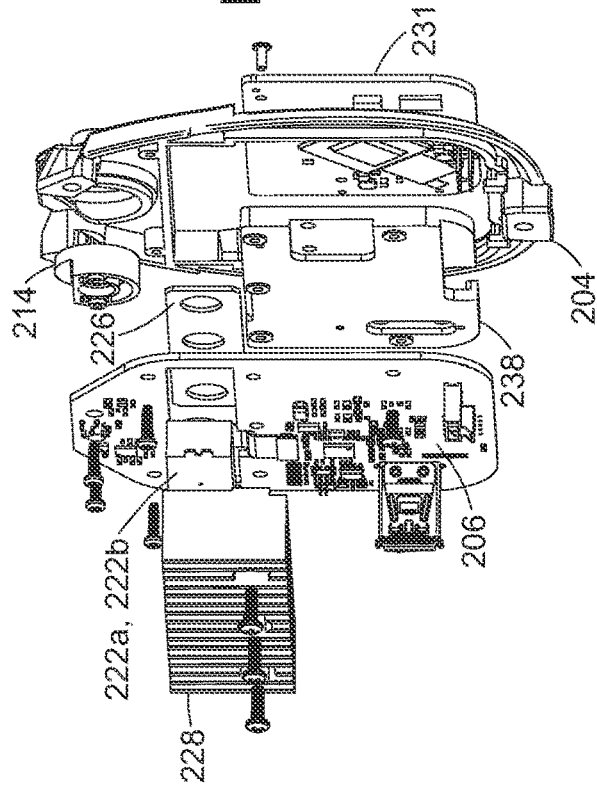
FIG. 12E is a rear perspective internal view of an embodiment of the sensor module of FIG. 12A.
Figure 12D:
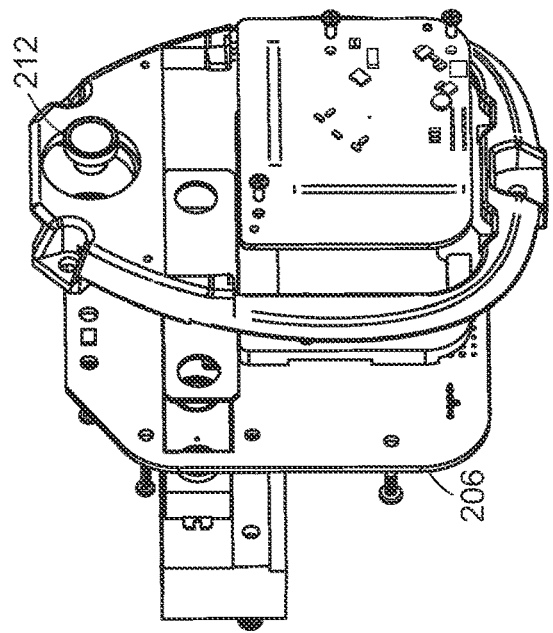
FIG. 12D is an exploded front perspective view of an embodiment of the sensor module of FIG. 12A.
Figure 12C:
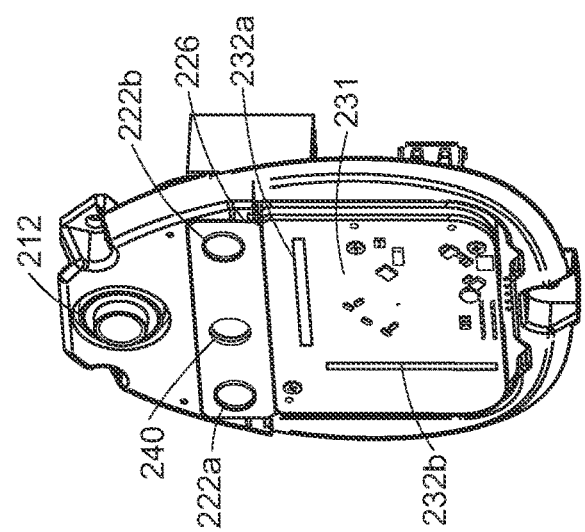
FIG. 12C is a front perspective view of an embodiment of internal portions of the sensor module of FIG. 12A.

FIGS. 12A-12E are views of an embodiment of internal portions of a sensor module 200, in accordance with aspects of inventive concepts. FIG. 12A is a front view of an embodiment of the internal portions of the sensor module 200. FIG. 12B is a side view of an embodiment of the internal portions of the sensor module 200 of FIG. 12A. FIG. 12C is a front perspective view of an embodiment of internal portions of a sensor module 200 of FIG. 12A. FIG. 12D is an exploded front perspective view of an embodiment of internal portions of the sensor module 200 of FIG. 12A. And FIG. 12E is a rear perspective view of an embodiment of internal portions of the sensor module 200 of FIG. 12A.

Referring to the embodiments of FIGS. 12A-12E, in some embodiments, the sensor module 200 comprises a mounting frame 204. In some embodiments, the mounting frame 204 is configured to couple the sensor module 200 to a follower vehicle 100, and may be formed of or include a rigid material, e.g., plastic, resin, or metal.

In some embodiments, the sensor module 200 comprises a printed circuit board (PCB) 206. PCB 206 can comprise various connectors, communication paths, and integrated circuits useful in supporting operations of the monocular imaging system 210, the stereoscopic imaging system 220, and/or the radar imaging system 230.

In some embodiments, the sensor module 200 comprises a lens mount 214. In some embodiments, the lens mount 214 is configured to secure a monocular camera 212 of the monocular imaging system 210 to the mounting frame 204. The lens mount 214 secures the monocular camera 212 to the mounting frame 204 so that the monocular camera lens 213 is aligned with and exposed though an opening in the sensor module cover 202, e.g., as shown in FIGS. 8A and 9A.

In some embodiments, the sensor module 200 comprises a light shield 226, which functions to prevent and/or mitigate leakage of light within the sensor module 200 and among its internal components. In this embodiment, the light shield 226 includes three circular openings, 226a, 226b, and 226c. Openings 226a and 226b receive cameras 222a and 222b, which form a stereo camera 222 of the stereoscopic ranging camera 220. In various embodiments, the light shield 226 can be disposed and secured between the PCB 206 and the mounting frame 204. The PCB 206 can define or include at least one opening to receive the stereo camera 222.

In some embodiments, such as the one shown in FIG. 12E, the sensor module 200 also comprises a stereoscopic camera heatsink 228. The heatsink 228 can be coupled to a rear side of the stereo cameras 222a, 222b, which extend though the opening in the PCB 206. The heatsink 228 can be secured to the PCB 206 and/or heatsink 228, for example, using one or more screws or any other type of fastener or adhesive, e.g., see FIG. 12E. The heatsink 228 and/or PCB 206 can be secured to the mounting plate 204, for example, using one or more screws or any other type of fastener or adhesive, e.g., see FIG. 12E.

In some embodiments, opening 226c is formed to receive the IR pattern projector 240. The opening 226c aligns with a corresponding opening for the IR pattern projector lens 243 in the sensor module cover 202. The IR pattern projector 240 and lens cover 243 are optionally provided, but could be omitted. In various embodiments, the IR pattern projector 240 can be used as a light source in low light situations.

In the embodiments of FIGS. 12A-12E, the sensor module includes a radar imaging system 230. In some embodiments, such as the one shown in FIG. 12E, the sensor module 200 comprises a radar heatsink 238.

Figure 13A:
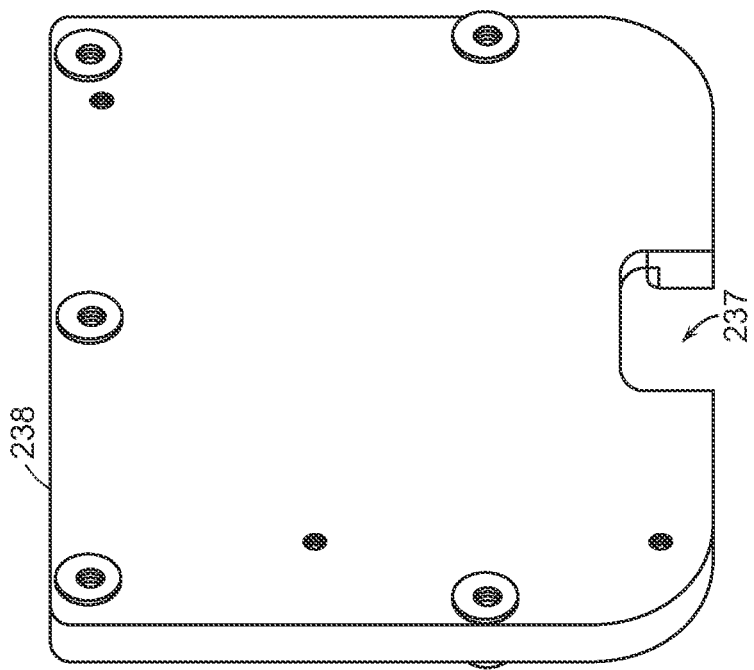
FIG. 13A is a front perspective view of an embodiment of a radar heatsink of a sensor module, in accordance with aspects of inventive concepts.
Figure 13B:
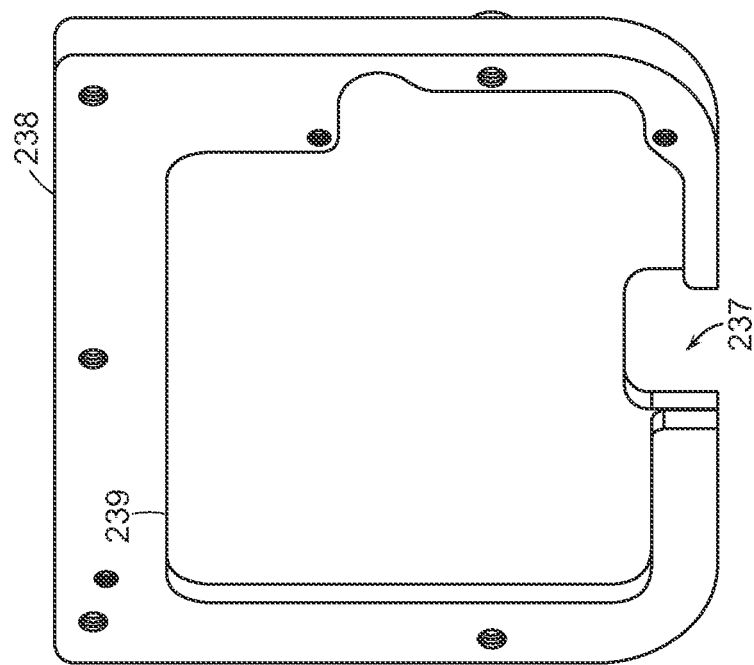
FIG. 13B is a rear perspective view of an embodiment of the radar heatsink of FIG. 13A, in accordance with aspects of inventive concepts.

FIG. 13A is a front perspective view of an embodiment of a radar heatsink 238, in accordance with aspects of inventive concepts. In this view, the side of the radar heatsink 238 facing a radar system printed circuit board (PCB) 231 is shown. FIG. 13B is a rear perspective view of an embodiment of a radar heatsink 238, in accordance with aspects of inventive concepts. In this view, the rear, PCB side of the radar heatsink 238 faces PCB 206. The front, radar side of the heatsink 238 in FIG. 13A includes a cutout or depression to accommodate coupling of the radar PCB 231, and is forward facing. The heatsink 238 can be formed to have this structure, or the cutout or depression can be etched or cutout of a surface of a plate made from a thermally conductive heatsink material. The heatsink 238 also includes a notch 237 that accommodates passage of connectors 235 from the radar system PCB 231 to the camera system PCB 206.

Figure 14A:
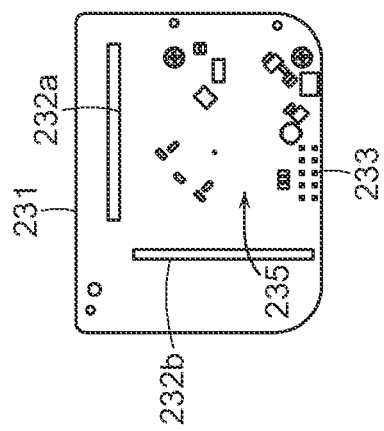
FIGS. 14A-14C show an embodiment of a radar system printed circuit board, in accordance with aspects of inventive concepts.
Figure 14C:
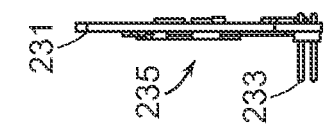
Figure 14B:
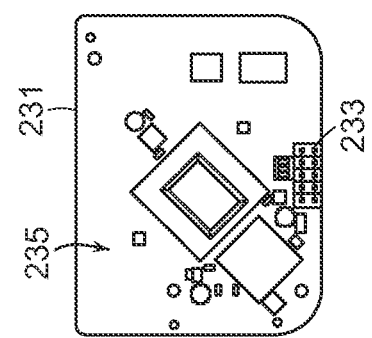

FIGS. 14A-14C show an embodiment of a radar PCB 231, in accordance with aspects of inventive concepts. FIG. 14A is a front view of an embodiment of the radar system PCB 231, in accordance with aspects of inventive concepts. FIG. 14B is a rear view of an embodiment of the radar system PCB 231 of FIG. 14A. And FIG. 14C is a side view of an embodiment of a radar system PCB 231 of FIG. 14A.

In some embodiments, the radar system PCB 231 forms part of the sensor module 200 of a follower vehicle 100. In some embodiments, one or more radar sensors or antennas 232 (e.g., 232a, 232b) of the radar imaging system 230 are coupled to the radar system PCB 231. In the embodiment shown in FIG. 14A, two antennas 232a, 232b are coupled to the radar system PCB 231. In alternative embodiments, a different number of antennas 232 can be coupled to the radar system PCB 231. In some embodiments, the radar system 230 comprises one or more antennas 232 that are not coupled to a radar system printed circuit board 231.

In the embodiments shown, the radar antennas 232a and 232b are oriented orthogonally in the same plane within radar PCB 231. In alternative embodiments, the one or more antennas 232 may be configured differently on the radar system PCB 231.

Figure 15:
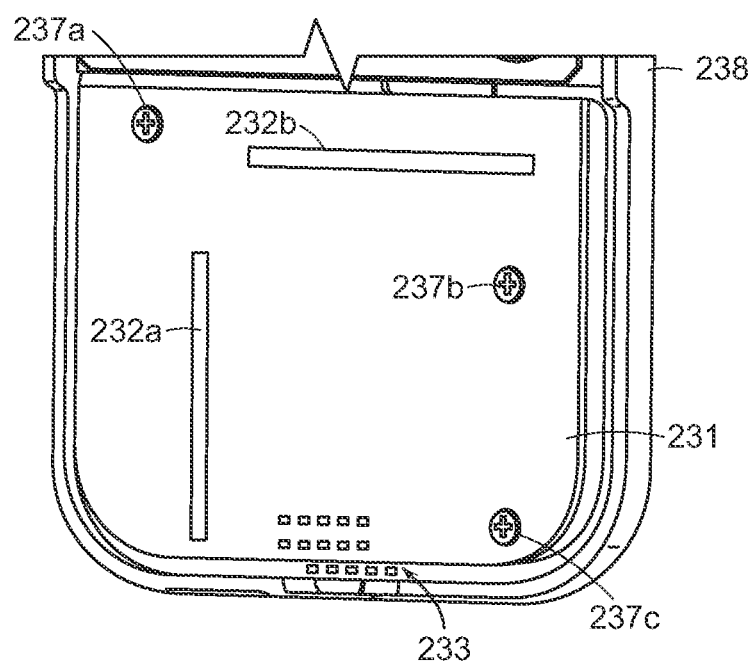
FIG. 15 is a front perspective view of an embodiment of the radar system printed circuit board of FIGS. 14A-14C coupled to the radar heatsink of FIGS. 13A and 13B, in accordance with aspects of inventive concepts.

FIG. 15 is a front perspective view of an embodiment of a radar system PCB 231 coupled to a radar heatsink 238, in accordance with aspects of inventive concepts. As shown in FIGS. 12A-12E, the radar PCB 231 can be coupled to the radar heatsink 238 with the mounting bracket 204 disposed between the radar PCB 231 and the heatsink 238.

In some embodiments, the radar system PCB 231 is coupled to a radar heatsink 238 using one or more fasteners 237. In some embodiments, such as the one shown in FIG. 15, the one or more fasteners 237 includes one or more 3×2 mm wafer head screws 237. In the embodiment shown in FIG. 15, the radar system printed circuit board 231 is coupled to a radar heatsink 238 using three 3×2 mm wafer head screws 237a, 237b, 237c. In alternative embodiments, a different number and/or type of fasteners 237 can be used. In alternative embodiments, the position of the one or more fasteners 237 can be different.

In alternative embodiments, the radar system PCB 231 is coupled to the radar heatsink 238 using one or more alternative fasteners, including, but not limited to, glue, solder, tape, or any such suitable mechanism for coupling two items.

Combining three-dimensional (3D) optical imaging with wide field of view (FOV) monocular imaging In some embodiments, a sensor system includes an optical imaging system employing stereoscopic camera configured to implement stereoscopic ranging techniques and a wide field monocular imaging system to provide robust image and 3D point clouds under changing environmental conditions. The system comprises a stereoscopic ranging camera system 220 and a wide FOV monocular imaging system 210. The stereo and monocular systems 220, 210 are placed near each other on the vehicle and have overlapping fields-of-view (FOV). The stereoscopic ranging camera system 220 includes a pair of cameras 222, each having a stereo camera lens 223. The monocular camera system 210 includes a monocular camera 212 having a monocular camera lens 213.

In this embodiment, the use of a stereoscopic ranging optical imaging system 220 with a wide FOV monocular imaging system 210 is combined. Both systems 210, 220 supply information to the tracking system, such as core 150. The tracking system monitors the point information along with the image information to calculate the location of the leader with respect to the vehicle 100. In the event that one sensor or the other is compromised by some external factor, such as sunlight, the other sensor can still provide adequate information to maintain operation until the disturbance is removed. In situations where the leader moves to the side of the FOV of the 3D ranging system, the angular bearing can still be determined in the wide FOV monocular camera 212 to allow the vehicle 100 to be rotated to the right heading to recapture the leader in the 3D sensor FOV, e.g., see FIGS. 7A and 7B.

Figure 16B:
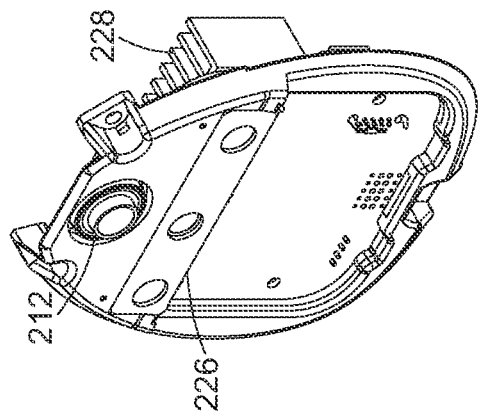
FIGS. 16A-16C are views of an embodiment of portions of a sensor module comprising a stereoscopic imaging system and a monocular imaging system, in accordance with aspects of inventive concepts.
Figure 16A:
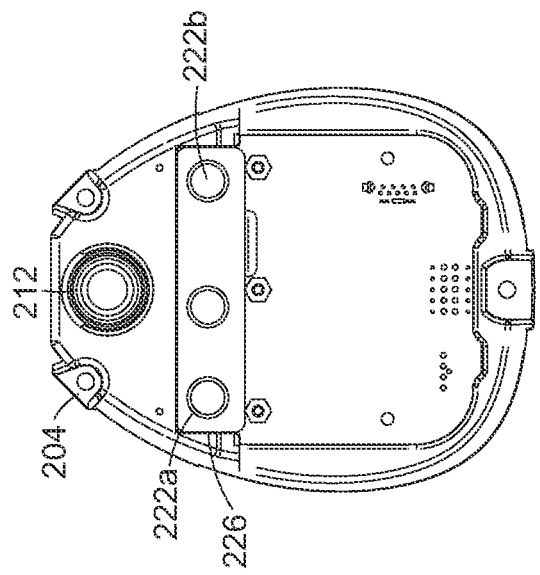
Figure 16C:
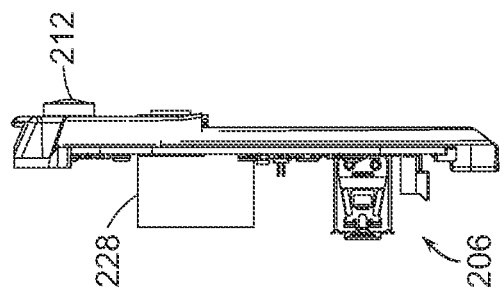

FIGS. 16A-16C are views of an embodiment of internal portions of a sensor module 200 comprising a stereoscopic imaging system 220 and a monocular imaging system 210, in accordance with aspects of inventive concepts. Where portions of the sensor module 200 were discussed herein above, duplicate description will be omitted here.

FIG. 16A is a front view of an embodiment of internal portions of the sensor module 200 comprising a stereoscopic imaging system 220 and a monocular imaging system 210, in accordance with aspects of inventive concepts. FIG. 16B is a perspective view of an embodiment of internal portions of the sensor module 200 comprising a stereoscopic imaging system 220 and a monocular imaging system 210 of FIG. 16A. FIG. 16C is a side view of an embodiment of internal portions of the sensor module 200 of FIG. 16A. In all of these views, the radar system is omitted.

In some embodiments, this sensor module 200 configuration (e.g., 3D optical imaging with wide FOV monocular imaging) is mounted on a follower vehicle 100 with one or more of the characteristics of the embodiment shown in FIG. 1.

Combining 3D Stereoscopic Optical Imaging with Radar Imaging

In some embodiments, a sensor system includes a stereoscopic ranging imaging system employing machine vision techniques and a high-resolution multi-antenna radar imaging system to provide robust 3D point clouds under changing environmental conditions. The system includes a stereo camera system 220, having a pair of cameras 222a, 222b, and a 4D (x, y, z, v) radar ranging system 230, having at least one antenna 232. The stereo camera 222 and radar systems 230 are placed near each other on the vehicle 100 and have overlapping fields-of-view (FOV), e.g., see FIGS. 7B and 7C.

In this embodiment, the use of a stereoscopic ranging optical imaging system 220 with a high-resolution radar system 230 is combined. Both sensors 222, 232 supply information to the tracking system, e.g., core 150. The tracking system monitors the point information along with the image information to calculate the location of the leader 50 with respect to the vehicle 100. In the event that one sensor or the other is compromised by some external factor, such as sunlight, the other sensor can still provide adequate information to maintain operation until the disturbance is removed.

Figure 17B:
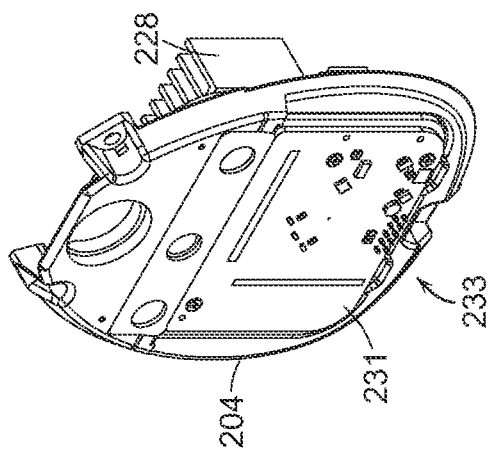
FIGS. 17A-17C are views of an embodiment of portions of a sensor module comprising a stereoscopic imaging system and a radar imaging system, in accordance with aspects of inventive concepts.
Figure 17A:
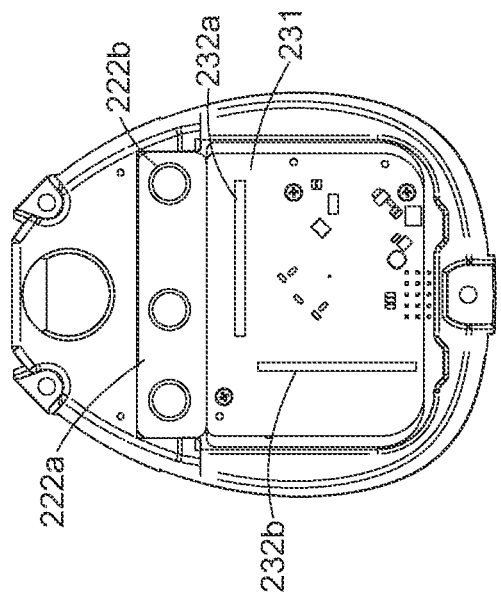
Figure 17C:
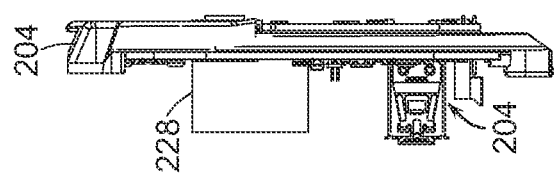

FIGS. 17A-17C are views of an embodiment of internal portions of the sensor module 200, in accordance with aspects of inventive concepts. In the views shown in FIGS. 17A-17C, the cover 202 has been omitted to show the internal components. In this embodiment, the sensor module 200 comprises at least the stereoscopic imaging system 220 and the radar imaging system 230. In the embodiment of FIGS. 17A-17C, the monocular camera system 210 can be omitted. Where portions of the sensor module 200 were discussed herein above, duplicate description will be omitted here.

FIG. 17A is a front view of an embodiment of internal portion of a sensor module 200. FIG. 17B is a perspective view of an embodiment of portions of the sensor module 200 of FIG. 17A. FIG. 17C is a side view of an embodiment of internal portions of the sensor module 200 of FIG. 17A.

In some embodiments, this sensor module 200 configuration (e.g., 3D optical imaging with radar imaging) is mounted on a follower vehicle 100 with one or more of the characteristics of the embodiment shown in FIG. 1.

Combining Radar with wide-FOV monocular optical imaging.

In some embodiments, a sensor system includes an optical imaging system employing machine vision techniques and a high-resolution multi-antenna radar imaging system to provide robust 3D point clouds under changing environmental conditions. The system includes a wide FOV monocular camera system 210, including a color camera 212, and a 4D (x,y,z,v) radar ranging system 230, including at least one antenna 232. The camera and radar systems 210, 230 are placed near each other on the vehicle 100 and have overlapping fields-of-view (FOV), e.g., see FIGS. 7A and 7C.

Radar systems employ RF signal emissions and reflections to identify the range to a target. Multiple antenna systems can provide range to targets along with X, Y, or, elevation and azimuth information. Modern solid state radar systems can provide high resolution imaging providing x,y,z and velocity information for each voxel sensed. Radar systems, however, cannot operate at the same speed as optical systems, do not yet have the same high resolution, and do not provide any information about color in the scene.

Monocular imaging systems cannot by themselves provide range data, but if the target is identifiable they can provide bearing information. Optimizing the performance of a ranging imager generally requires its FOV to be limited to 90 degrees or less. In situations where the leader moves to the side of the FOV of the 3D ranging system, the angular bearing can still be determined in the wide FOV monocular camera to allow the vehicle to be rotated to the right heading to recapture the leader in the 3D sensor FOV.

In this embodiment, the use of a wide FOV monocular optical imaging system 210 with a high-resolution radar system 230 are combined. Both sensors 212, 232 supply information to the tracking system, e.g., core 150. The tracking system monitors the point information along with the image information to calculate the location of the leader with respect to the vehicle 100. In the event that one sensor or the other is compromised by some external factor, such as sunlight, the other sensor can still provide adequate information to maintain operation until the disturbance is removed. In situations where the leader moves to the side of the FOV of the radar ranging system, the angular bearing can still be determined in the wide FOV monocular camera 212 to allow the vehicle 100 to be rotated to the right heading to recapture the leader in the radar sensor 232 FOV.

Figure 18B:
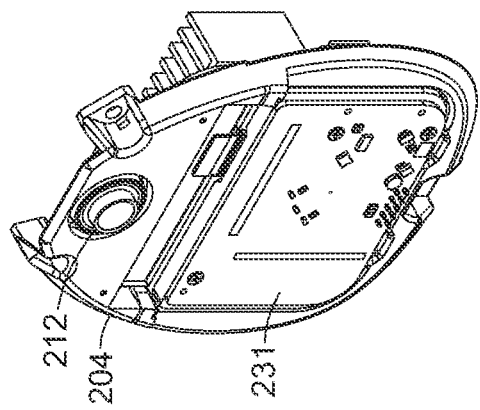
FIGS. 18A-18C are views of an embodiment of internal portions of a sensor module comprising a monocular imaging system and a radar imaging system, in accordance with aspects of inventive concepts.
Figure 18A:
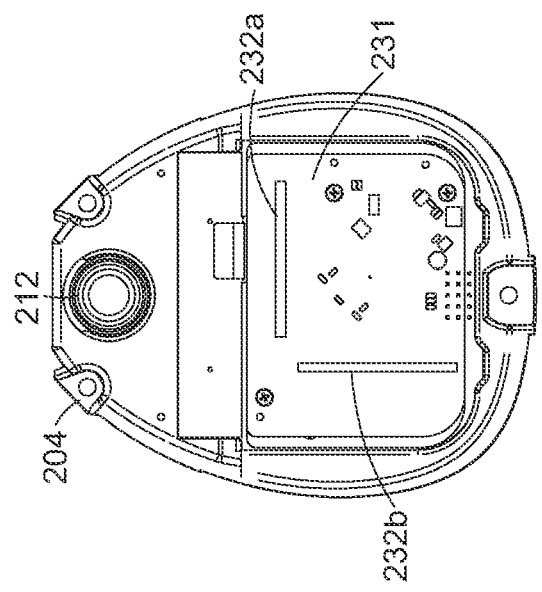
Figure 18C:
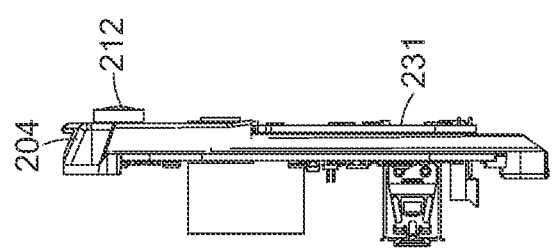

FIGS. 18A-18C are views of an embodiment of internal portions of a sensor module 200 comprising a monocular imaging system 210 and a radar imaging system 230, in accordance with aspects of inventive concepts. In the views shown in FIGS. 18A-18C, the cover 202 has been omitted to show the internal components. Where portions of the sensor module 200 were discussed herein above, duplicate description will be omitted here.

FIG. 18A is a front view of an embodiment of internal portions of a sensor module 200 comprising a monocular imaging system 210 and a radar imaging system 230, in accordance with aspects of inventive concepts. FIG. 18B is a perspective view of an embodiment of internal portions of the sensor module 200 of FIG. 18A. FIG. 18C is a side view of an embodiment of internal portions of the sensor module 200 of FIG. 18A.

In some embodiments, this sensor module 200 configuration (e.g., monocular imaging with radar imaging) is mounted in a follower vehicle 100 with one or more of the characteristics of the embodiment shown in FIG. 1.

Figure 19:
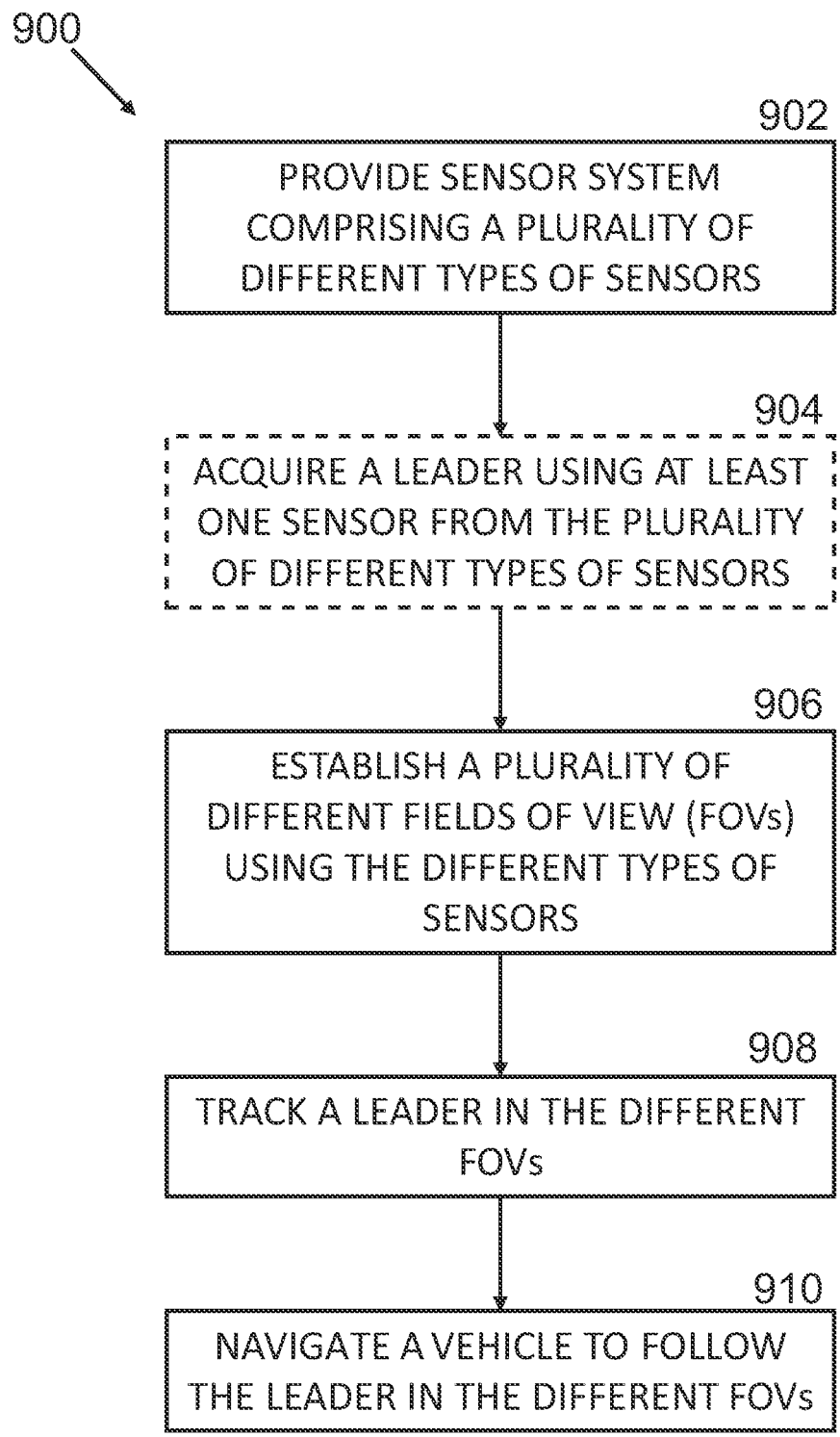
FIG. 19 is an embodiment of a method of tracking and following a leader using a sensor system and/or module, in accordance with aspects of inventive concepts.

FIG. 19 is an embodiment of a method 900 of tracking and following a leader using a sensor system and/or module, in accordance with aspects of inventive concepts.

In step 902, a sensor system is provided that comprises a plurality of different types of sensing systems and/or sensors. Such sensors can include, but are not limited to, a monocular camera, stereoscopic camera, and/or a 3D radar imaging system. In step 904, a leader to be tracked is acquired. Optionally, a user interface can be included comprising at least one user interface mechanism operable by the leader to initiate a pairing operation to activate at least one sensing system and/or sensor from the plurality of different sensing systems and/or sensors to record at least one characteristics of the leader. In some embodiments, the user interface could comprise a biometric sensor configured to collect biometric information associated with the leader, and the at least one characteristics of the leader is determined using the biometric information. When a leader is acquired, and its characteristics stored in memory, and a paring operation is complete, the plurality of different types of sensing systems and/or sensors can be used to track and/or follow the leader. Step 904 is optional in that acquiring and paring with the leader could be separately accomplished without the plurality of different types of sensing systems and/or sensors.

In step 906, the plurality of different types of sensing systems and/or sensors are used to establish a plurality of different fields of view (FOVs). Two or more of the FOVs can be overlapping, but the different FOVs can have different angular widths. Depending on movement of the leader, the leader may not be located in overlapping portions of the different fields of view at all times. Therefore, is step 908 the different sensors and sensor systems may operate in a complimentary manner, where a subset of the different sensors and sensor systems may track the leader in its FOV depending on the leader's position. But in some instances, in step 908, the leader may be in overlapping portions of different FOVs and tracked by multiple sensors or sensor systems at the same time.

In some embodiments, the sensor system includes a sensor module which can be coupled to or form part of a vehicle, e.g., a follower vehicle, and or a stationary or permanent surface. When coupled to or forming part of a follower vehicle, the vehicle can navigate using sensor data from the plurality of different types of sensing systems and/or sensors as the leader travels within their various FOVs, in step 910.

While aspects of inventive concepts have been shown and described in the context of a follower vehicle, the sensor system and sensor module could have much broader application where it is useful for a sensor system or other system to follow movement of a leader. Some embodiments could include using the sensor system and/or sensor module with other vehicle types and in stationary situations, e.g., where the sensor module is attachable to a different type of mobile apparatus, a stationary object, or a permanent structure, such as a wall. In various embodiments, therefore, the sensor module, e.g., via a mounting plate, can be configured to couple to different types of surfaces.

Additionally, those skilled in the art, having the benefit of this disclosure, will appreciated that the sensor module could take other form factors without departing from the present invention. The invention is not limited by the particular form factors shown herein. Those skilled in the art, having the benefit of this disclosure, will also appreciated that various other type of sensor technologies could be used in combination with or instead of the disclosed forms of sensing technologies, particularly in those embodiments in which the sensor data produced by such technologies enabled the tracking and following of a leader 50 by a follower vehicle.

While the foregoing has described what are considered to be the best mode and/or other preferred embodiments, it is understood that various modifications can be made therein and that the inventive concepts may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the inventive concepts, which are, for clarity, described in the context of separate embodiments, may also be provide in combination in a single embodiment. Conversely, various features of the inventive concepts which are, for brevity, described in the context of a single embodiment may also be provided separately or in any suitable sub-combination.

For example, it will be appreciated that all of the features set out in any of the claims (whether independent or dependent) can be combined in any given way.

What is claimed is:

1. A sensor apparatus, comprising:
a plurality of sensing systems each comprising a different type of imaging sensor configured to cooperatively track a leader, wherein the different types of imaging sensors include (a) a three-dimensional (3D) radio imaging sensor having a radar PCB and an antenna, and (b) a wide-angle field-of-view (FOV) monocular camera; and
a sensor module including:
a cover configured to: (a) encase the different types of imaging sensors and (b) be coupled to a vehicle, and
a mounting frame; wherein the radar PCB and the wide angle FOV monocular camera are coupled to the mounting frame so that the radar PCB is disposed in parallel in a bottom area of the mounting frame, and the wide angle FOV monocular camera is disposed in a top area of the mounting frame above the radar PCB.

2. The apparatus of claim 1, wherein the plurality of sensing systems provides a plurality of fields of views including at least two overlapping fields of view.

3. The apparatus of claim 2, wherein the plurality of fields of view includes at least three overlapping fields of view.

4. The apparatus of claim 1, wherein
the cover includes a radome area.

5. The apparatus of claim 1, wherein a field of view of the at least one 3D radio imaging sensor is between 90 degrees and 180 degrees.

6. The apparatus of claim 1, wherein a field of view of the at least one 3D radio imaging sensor is about 160 degrees.

7. The apparatus of claim 4, wherein the antenna is disposed in parallel to the radome area of the cover.

8. The apparatus of claim 1, wherein the cover includes a radome area formed of material transparent to radio waves of the at least one antenna and located proximate to the radar PCB.

9. The apparatus of claim 1, wherein the plurality of different sensing systems further include a three-dimensional (3D) optical imaging sensor.

10. The apparatus of claim 9, wherein
the 3D optical imaging system comprises:
  a sensor system PCB; and
  a stereo camera coupled to the sensor system PCB.

11. A sensor apparatus, comprising:
a plurality of sensing systems each comprising a different type of imaging sensor configured to cooperatively track a leader, wherein the different types of imaging sensors include: (a) a three-dimensional (3D) optical imaging system, which includes a sensor system PCB and a stereo camera coupled to the sensor system PCB, and (b) a 3D radio imaging system, comprising a radar PCB having an antenna; and
a sensor module including:
  a cover configured to (a) encase the different types of imaging sensors and (b) be coupled to a vehicle; and
  a mounting frame, wherein the radar PCB and the sensor system PCB are coupled to the mounting frame so that the radar PCB is disposed in parallel in a bottom area of the mounting plate near a radome area of the cover, and the stereo camera is disposed in a top area of the mounting plate above the radar PCB.

12. A sensor apparatus, comprising:
a plurality of sensing systems each comprising a different type of imaging sensor configured to cooperatively track a leader, wherein the different types of imaging sensors include: (a) a three-dimensional (3D) optical imaging system, which includes a sensor system PCB and a stereo camera coupled to the sensor system PCB (b) a 3D radio imaging system, which includes a radar PCB comprising an antenna and (c) a wide-angle field-of-view (FOV) monocular imaging system having a wide angle FOV monocular camera; and
a sensor module including:
  a cover configured to (a) encase the different types of imaging sensors and (b) be coupled to a vehicle; and
  a mounting frame, wherein the radar PCB and the sensor system PCB are coupled to the mounting frame so that the radar PCB is disposed in parallel in a bottom area of the mounting plate near a radome area of the cover, and the stereo camera is disposed in a top area of the mounting plate above the radar PCB;
wherein the 3D radio imaging system including a radar PCB having an antenna.

* * * * *